United States Patent
Li et al.

(10) Patent No.: US 11,616,680 B2
(45) Date of Patent: Mar. 28, 2023

(54) SYNCHRONIZATION SEQUENCE DESIGN FOR DEVICE-TO-DEVICE COMMUNICATION

(71) Applicant: Apple Inc., Cupertino, CA (US)

(72) Inventors: Yang Li, Plano, TX (US); Tianyan Pu, Cupertino, CA (US); Li Su, San Jose, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/931,873

(22) Filed: May 14, 2020

(65) Prior Publication Data

US 2020/0274751 A1 Aug. 27, 2020

Related U.S. Application Data

(63) Continuation of application No. 16/110,377, filed on Aug. 23, 2018, now Pat. No. 10,666,489.

(60) Provisional application No. 62/664,773, filed on Apr. 30, 2018, provisional application No. 62/617,998, filed on Jan. 16, 2018, provisional application No. 62/596,548, filed on Dec. 8, 2017, provisional
(Continued)

(51) Int. Cl.
*H04L 27/26* (2006.01)
*H04W 56/00* (2009.01)

(52) U.S. Cl.
CPC .... *H04L 27/2692* (2013.01); *H04L 27/26132* (2021.01); *H04W 56/001* (2013.01); *H04W 56/002* (2013.01)

(58) Field of Classification Search
CPC .......... H04L 27/2692; H04L 27/2613; H04W 56/001; H04W 56/002
See application file for complete search history.

(56) References Cited

U.S. PATENT DOCUMENTS 7,548,506 B2 * 6/2009 Ma .................... H04L 5/0048
370/208
7,548,508 B2 * 6/2009 Geile .................... H04H 60/11
370/208
(Continued)

FOREIGN PATENT DOCUMENTS

JP 2004519887 A 7/2004
JP 2015142346 A 8/2015
(Continued)

OTHER PUBLICATIONS

Office Action, Japanese Patent Application No. 2018-162031, dated Aug. 2, 2019; six pages.
(Continued)

*Primary Examiner* — Mohammad S Anwar
(74) *Attorney, Agent, or Firm* — Kowert, Hood, Munyon, Rankin & Goetzel, P.C.

(57) ABSTRACT

This disclosure relates to techniques for supporting narrowband device-to-device wireless communication, including possible techniques for providing synchronization sequences. A first wireless device may transmit a preamble of a device-to-device wireless communication with a second wireless device. The preamble may include a first synchronization sequence. The first synchronization sequence may include multiple repetitions of a basis sequence, multiplied by a cover code. The basis sequence may span multiple orthogonal frequency division multiplexing symbols.

20 Claims, 22 Drawing Sheets

Related U.S. Application Data application No. 62/573,193, filed on Oct. 17, 2017, provisional application No. 62/559,813, filed on Sep. 18, 2017.

(56) References Cited

U.S. PATENT DOCUMENTS

| | | | |
|---|---|---|---|
| 9,219,600 | B1 | 12/2015 | Landon |
| 9,917,616 | B2 | 3/2018 | Baldemair |
| 10,666,489 | B2 | 5/2020 | Li et al. |
| 2006/0020433 | A1 | 1/2006 | Taha |
| 2009/0125792 | A1 | 5/2009 | Lakkis |
| 2009/0252334 | A1 | 10/2009 | Chang |
| 2009/0316757 | A1 | 12/2009 | ten Brink |
| 2012/0188897 | A1* | 7/2012 | Shen ............... H04W 52/146 370/252 |
| 2013/0157670 | A1 | 6/2013 | Koskela |
| 2014/0321360 | A1* | 10/2014 | Han ............... H04N 7/147 370/328 |
| 2015/0071256 | A1* | 3/2015 | Hwang ............... H04W 76/14 370/336 |
| 2015/0215842 | A1 | 7/2015 | Lim |
| 2015/0229368 | A1 | 8/2015 | Ma |
| 2015/0264588 | A1 | 9/2015 | Li |
| 2015/0327180 | A1 | 11/2015 | Ryu |
| 2015/0373656 | A1* | 12/2015 | Kim ............... H04W 56/0085 370/350 |
| 2016/0119933 | A1* | 4/2016 | Merlin ............... H04W 72/0453 370/312 |
| 2016/0192332 | A1 | 6/2016 | Koorapaty |
| 2016/0227496 | A1* | 8/2016 | Panteleev ............... H04W 4/90 |
| 2016/0270012 | A1 | 9/2016 | Chen |
| 2016/0286506 | A1* | 9/2016 | Chae ............... H04L 5/0051 |
| 2016/0337103 | A1* | 11/2016 | Kim ............... H04L 5/0048 |
| 2017/0064533 | A1 | 3/2017 | Fujikami |
| 2017/0064620 | A1 | 3/2017 | Wang |
| 2017/0093540 | A1 | 3/2017 | Lei |
| 2017/0094621 | A1 | 3/2017 | Xu |
| 2017/0127367 | A1* | 5/2017 | Axnas ............... H04W 72/0446 |
| 2017/0187563 | A1 | 6/2017 | Shin |
| 2017/0230923 | A1* | 8/2017 | Huang ............... H04W 56/0025 |
| 2017/0237591 | A1 | 8/2017 | Atungsiri |
| 2017/0251472 | A1 | 8/2017 | Lee |
| 2017/0264406 | A1* | 9/2017 | Lei ............... H04L 5/0053 |
| 2017/0288848 | A1 | 10/2017 | Lei |
| 2019/0044690 | A1 | 2/2019 | Yi |

FOREIGN PATENT DOCUMENTS

| | | |
|---|---|---|
| JP | 2016511611 A | 4/2016 |
| JP | 2016197926 A | 11/2016 |
| JP | 2016535501 A | 11/2016 |
| JP | 2017509221 A | 3/2017 |

OTHER PUBLICATIONS

Alcatel-Lucent Shanghai Bell, Alcatel-Lucent; "Preamble design for D2D Discovery"; 3GPP TSG-RAN WG1 Meeting #76bis; R1-141254; Shenzhen, China; Apr. 4, 2014; four pages.

Nokia Corporation, Nokia Networks; "Frequency hopping for discovery signal repetition"; 3GPP TSG-RAN WG1 Meeting #79; R1-144985; San Francisco, USA; Nov. 21, 2014; five pages.

"3rd Generation Partnership Project; Technical Specification Group Radio Access Network; LTE Device to Device (D2D) Proximity Services (ProSe); User Equipment (UE) radio transmission and reception (Release 12)"; 3GPP TR 36.877, 3rd Generation Partnership Project (3GPP), Mobile Competence Centre; 650, Route Des Lucioles; F-06921 Sophia-Antipolis Cedex; France; vol. RAN WG4, No. V12.0.0; Mar. 28, 2015; pp. 1-40; XP050928178.

LG Electronics; "On the Design of D2DSS and PD2DSCH"; 3GPP Draft; R1-140329; 3rd Generation Partnership Project (3GPP), Mobile Competence Centre; 650, Route Des Lucioles; F-06921 Sophia-Antipolis Cedex; France, vol. RAN WG1, No. Prague, Czech; Feb. 9, 2014; XP050735876; ten pages.

Intel Corporation; "On NB-IoT scope in Rel-14 FeD2D"; 3GPP Draft; R2-163625, 3rd Generation Partnership Project (3GPP), Mobile Competence Centre; 650, Route Des Lucioles; F-06921 Sophia-Antipolis Cedex; France, vol. RAN WG2, No. Nanjing, China; May 22, 2016; XP051105063; four pages.

Nokia et al; "Issues in 020 Discovery Signal Design"; 3GPP Draft; R1-141539; 3rd Generation Partnership Project (3GPP), Mobile Competence Centre; 650, Route Des Lucioles; F-06921 Sophia-Antipolis Cedex; France, vol. RAN WG1, No. Shenzhen, China; Mar. 30, 2014; XP050787207; six pages.

Nokia Corporation et al; "Frequency hopping for discovery signal repetition"; 3GPP Draft; R1-144985; 3rd Generation Partnership Project (3GPP), Mobile Competence Centre; 650, Route Des Lucioles; F-06921 Sophia-Antipolis Cedex ; France, vol. RAN WG1, No. San Francisco, USA; Nov. 17, 2014; XP050876031; six pages.

Extended European Search Report, European Patent Application No. 18191362.5, dated Jan. 16, 2019; eleven pages.

* cited by examiner

SYNCHRONIZATION SEQUENCE DESIGN FOR DEVICE-TO-DEVICE COMMUNICATION

PRIORITY INFORMATION

This application is a continuation application of U.S. patent application Ser. No. 16/110,377, titled "Synchronization Sequence Design for Device-to-Device Communication", filed Aug. 23, 2018, which claims priority to U.S. provisional patent application Ser. No. 62/559,813, entitled "Off Grid Radio Service System Design," filed Sep. 18, 2017; U.S. provisional patent application Ser. No. 62/573,193, entitled "Off Grid Radio Service System Design," filed Oct. 17, 2017; U.S. provisional patent application Ser. No. 62/596,548, entitled "Off Grid Radio Service System Design," filed Dec. 8, 2017; U.S. provisional patent application Ser. No. 62/617,998, entitled "Off Grid Radio Service System Design," filed Jan. 16, 2018; and U.S. provisional patent application Ser. No. 62/664,773, entitled "Synchronization Sequence Design for Device-to-Device Communication," filed Apr. 30, 2018, which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to possible synchronization sequence designs that could be used for device-to-device wireless communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing synchronization as part of narrowband device-to-device wireless communications.

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device communications. This disclosure presents various techniques for supporting such communications, including features and techniques for performing device-to-device synchronization communications using relatively narrow bandwidth communication channels.

According to the techniques described herein, a preamble-based approach to providing synchronization may be used in a device-to-device communication framework. In such an approach, a preamble may be transmitted by a wireless device performing a device-to-device communication (e.g., a discovery, control, data, or other communication) with a peer device that may help provide/maintain timing and/or frequency syncronization between the peer devices. Use of such synchronization preambles may also facilitate distinguishing between communications intended for different wireless devices, e.g., in a multi-user scenario.

The synchronization preambles may be structured to include one or more synchronization sequences, each sequence having multiple repetitions of a basis sequence multiplied by a cover code. The basis sequence may have a length spanning multiple orthogonal frequency division multiplexing symbols, for example if relatively narrow bandwidth communication channels are used, e.g., to provide a sufficiently long basis sequence to achieve an improved combination of autocorrelation properties of the basis sequence itself and the cross correlation properties of the basis sequence to other possible basis sequences.

The basis sequence and/or the cover code for a sychronization sequence used by a wireless device may be selected from multiple possible basis sequences and/or cover codes, potentially including a large pool of basis sequences and/or cover codes. The selection may be based on any number of considerations. As one possibility, identification information (e.g., for the transmitter or receiver, or for a link established between the transmitter and receiver) may be used as part of the selection process.

Additionally, it may be possible to utilize multiple (e.g., cascaded) such synchronization sequences in conjunction with a device-to-device communication, if desired. Such a technique may provide a substantial increase to the size of the candidate pool for unique preamble transmissions, at least in some instances.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
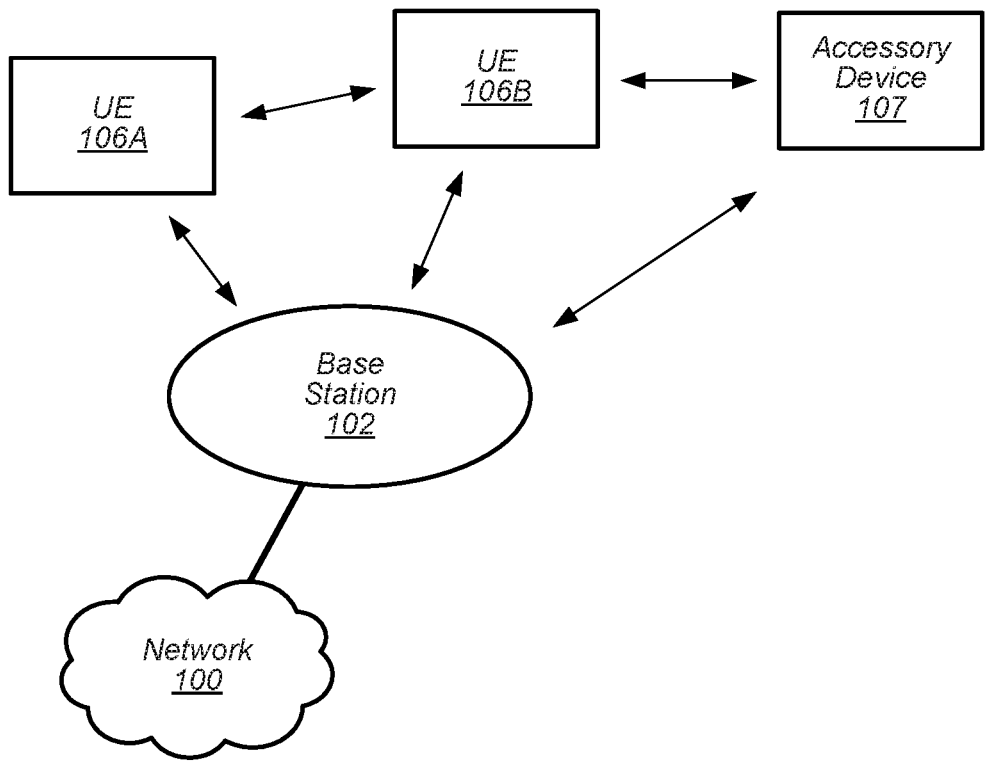
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
OOC: out-of-coverage

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
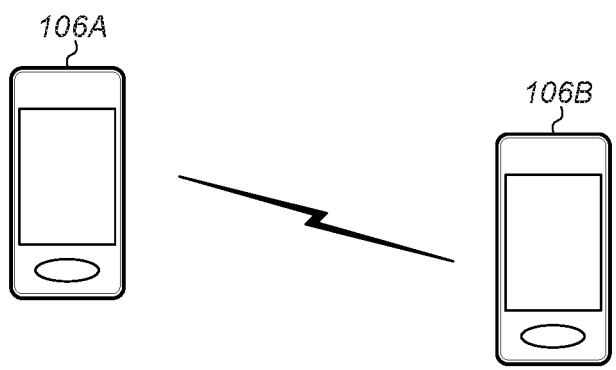
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, OGRS, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing narrowband D2D communication with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
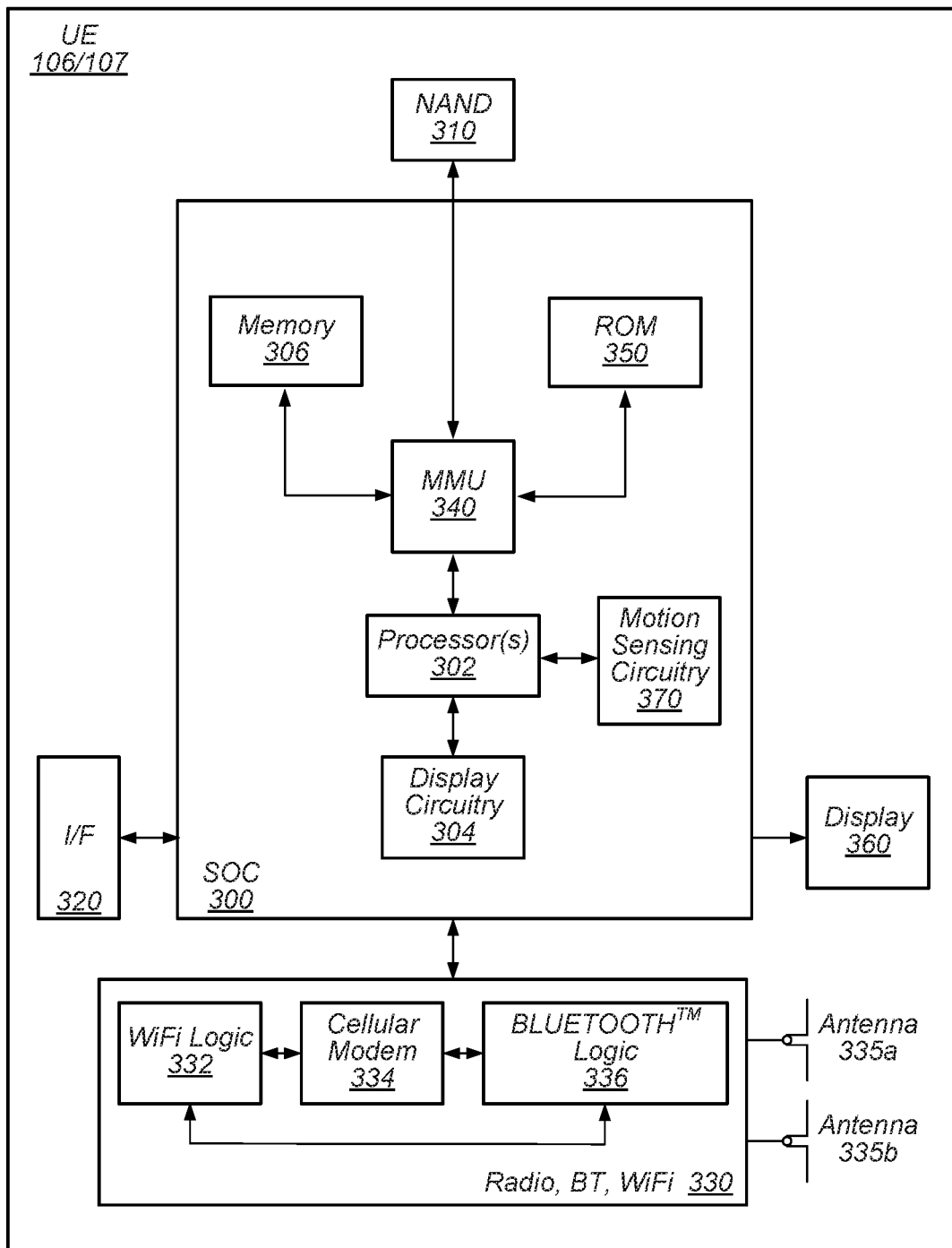
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RAT s).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
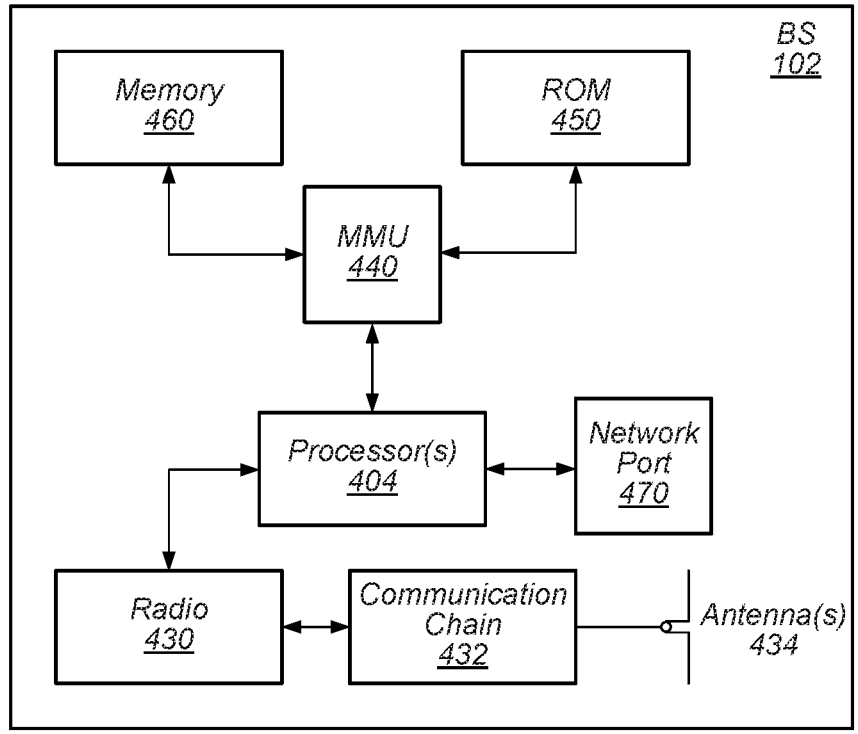
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform narrowband device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
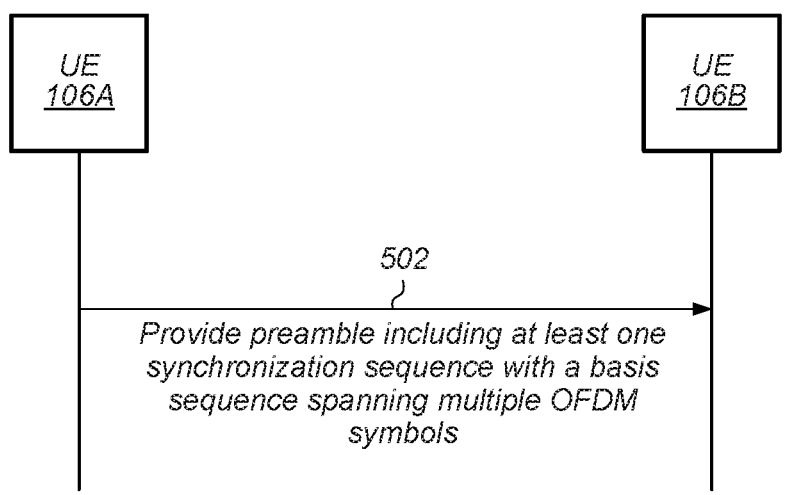
FIG. 5 is a communication flow diagram illustrating an exemplary method for performing narrowband device-to-device wireless communications, according to some embodiments.

FIG. 5—Communication Flow Diagram

FIG. 5 is a communication flow diagram illustrating a method for performing synchronization as part of narrowband device-to-device wireless communications, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the method of FIG. 5 are described in a manner relating to the use of communication techniques and/or features associated with LTE, OGRS, and/or 3GPP specification documents, such description is not intended to be limiting to the disclosure, and aspects of the method of FIG. 5 may be used in any suitable wireless communication system, as desired. As shown, the method may operate as follows.

In 502, a first wireless device (e.g., UE 106A) may provide a preamble of a D2D communication to a second wireless device (e.g., UE 106B). The preamble may include one or more synchronization sequences, e.g., including at least a first synchronization sequence. The first synchronization sequence may include a basis sequence that is transmitted on a certain number of subcarriers (e.g., in the frequency domain) and spans multiple OFDM symbols (e.g., in the time domain). The basis sequence may be repeated multiple times. The synchronization sequence may further include a cover code. For example, each OFDM symbol of the synchronization sequence may be multiplied by a cover bit of the cover code. As another possibility, each repetition of the sequence (e.g., including multiple OFDM symbols) may be multiplied by a cover bit of the cover code.

If one or more additional synchronization sequences are included in the preamble, each may similarly include multiple repetitions of a basis sequence multiplied by a cover code. Note that a similar effect may additionally or alternatively be achieved if multiple (e.g., cascaded) preambles are provided, with each including a synchronization sequence. Note that if multiple synchronization sequences are used (e.g., as part of the same preamble or in different preambles), any combination of types of synchronization sequences may be used. For example, different synchronization sequences included in the same preamble (and/or in cascaded preambles) may include synchronization sequences with the same or different overall length, the same or different basis sequence lengths, the same or different cover code lengths, and/or the same or different techniques for applying the cover code (e.g., multiplying cover bits on a per-OFDM-symbol basis or on a per-basis-sequence basis), among various possibilities. If desired, when multiple synchronization sequences are included in a preamble (and/or when multiple preambles are used), a temporal gap may be left between each temporally consecutive pair of synchronization sequences of the preamble(s). Alternatively, temporally consecutive pairs of synchronization sequences may be provided in a temporally contiguous manner, if desired.

The preamble may be provided as part of a narrowband D2D/P2P communication. The communication may be performed using one or more Narrowband Internet of Things (NB-IoT) carriers, and/or may be performed using any of various other possible (e.g., narrowband) carriers. Thus, as one possibility, the synchronization sequence(s) may be transmitted on a carrier frequency that has a frequency width of one physical resource block (e.g., 12 or 14 subcarriers having subcarrier spacing of 15 kHz, in some instances). Note that if desired, a frequency hopping pattern may be used in conjunction with the preamble, e.g., such that different frequency carriers may be used to transmit different portions (e.g., different synchronization sequences, different portions of each synchronization sequence, etc.) of the preamble over time.

Each synchronization sequence may be selected from multiple possible synchronization sequences. For example, multiple basis sequences may be possible, and multiple cover codes may be possible. Each unique possible synchronization sequence may include a unique basis sequence among the specified possible basis sequences combined with a unique cover code among the specified possible cover codes. Thus, in some instances, there may be a large number of possible synchronization sequences. Providing the possibility of including multiple synchronization sequences in a preamble may further expand the number of possible unique preambles that could be used, at least according to some embodiments.

In some instances, the synchronization sequence may be selected based at least in part on device identification information for the first wireless device, the second wireless device, and/or a link between the first wireless device and the second wireless device. For example, a mapping (e.g., utilizing one or more mathematical equations or functions) between (at least a portion of) the identification information of the transmitting device (or of the receiving device, or for a link that is established between the transmitting device and the receiving device, according to various embodiments) and a synchronization sequence associated with that identification information may be specified, that may facilitate the ability of wireless devices using such synchronization sequences as part of a communication framework to determine the intended recipient (and/or other control information) for a given transmission. In some instances, a current frame number and/or other information may additionally or alternatively be used as an input to the synchronization sequence selection algorithm. Providing a large number of possible synchronization sequences may accordingly help avoid collisions that could occur between wireless devices if they were mapped to the same synchronization sequence.

The set of possible synchronization sequences may be selected (e.g., encompassing specification of the possible basis sequences and cover codes) at least partially on the autocorrelation properties of each possible synchronization sequence, and/or at least partially based on the cross correlation properties of the possible synchronization sequences with each other. For example, it may be preferable for each synchronization sequence to have a relatively high autocorrelation with itself and a relatively low cross correlation with other synchronization sequences. This may increase the detectablity of synchronization sequence transmissions by their intended recipients while helping reduce interference from synchronization sequence transmissions by other wireless devices in the same vicinity, at least according to some embodiments.

As one example possibility, the set of possible basis sequences may include one or more basis sequences that include at least a portion of a Zadoff-Chu sequence. As another example possibility, the set of possible basis sequences may include one or more basis sequences generated at least in part by multiplying at least a portion of a M-sequence with at least a portion of a Zadoff-Chu sequence. As still another example possibility, the set of possible basis sequences may include one or more basis sequences generated at least in part by multiplying at least a portion of a Gold code with at least a portion of a Zadoff-Chu sequence. In some instances, the set of possible cover codes may include one or more cover codes that include at least a portion of a Gold code. It will be noted that these examples are intended to be illustrative only, and any number of other techniques for generating the set of possible basis sequences and/or the set of possible cover codes are also possible.

Note that the preamble may be provided in conjunction with any of various possible types/aspects of D2D communication. As one possibility, the narrowband D2D communication may include a discovery message in addition to the synchronization signal, and may be a discovery transmission, e.g., to facilitate discovering other wireless devices and potentially establishing one or more D2D communication links with those wireless devices. As another possibility, the narrowband D2D communication may be a control and/or data communication, e.g., that may be used to communicate control signaling and/or data between two wireless devices that have already established a D2D communication link.

The second wireless device may receive and detect the preamble(s) (e.g., including the synchronization sequence(s)) from the first wireless device. This may include utilizing any of various possible techniques to determine if a known synchronization sequence is being transmitted over the air. As one such possibility, the second wireless device may utilize a hierarchical correlator. For example, the hierarchical correlator may include a basis sequence correlator, which may be configured to correlate input samples with a local basis sequence reference (e.g., to perform autocorrelation of the OFDM symbols of the synchronization sequence), and may further include a cover sequence correlator, which may be configured to correlate output samples from the basis sequence correlator with a local cover sequence reference (e.g., to remove the cover code sequence). Other correlation techniques are also possible.

The second wireless device may be able to determine (e.g., at least partial) identification information associated with the preamble, for example based on the synchronization sequence(s) included in the preamble. For example, as previously noted, the synchronization sequence(s) included in the preamble may be mapped from the identification information (e.g., for the first wireless device, or for the second wireless device, or for a link between the first wireless device and the second wireless device), such that the second wireless device may in turn be able to reverse the mapping to determine the identification information from which synchronization sequence(s) is (are) included in the preamble.

As previously noted, in some instances, the preamble may include multiple synchronization sequences. In some embodiments, it may be possible for the receiver (e.g., the second wireless device) to successfully attain synchronization using a subset of the synchronization sequences. For example, if channel conditions are good, the receiver may be able to achieve timing and frequency synchronization and determine identification information associated with the preamble from an initial synchronization sequence (or more generally an initial subset of the synchronization sequences), and may be able to operate in a reduced power mode for the remainder of the preamble.

As previously noted, at least in some instances, the narrowband D2D communication may include a discovery message. Accordingly, in such instances, the second wireless device may attempt to decode the discovery message, e.g., to determine if the second wireless device is a discovery target of the first wireless device.

As another possibility, at least in some instances, the narrowband D2D communication may include control and/or data communications, e.g., after discovery and connection setup have already been performed. Accordingly, in such instances, the second wireless device may attempt to decode the control and/or data communication.

According to some embodiments, the second wireless device may (e.g., in response to the D2D communication including the synchronization sequence and/or at a later time) respond to the first wireless device, e.g., transmitting a D2D communication to the first wireless device. The second wireless device may use a similarly structured synchronization sequence for such a D2D communication, at least according to some embodiments. Note, however, that at least in some instances, a different synchronization sequence may be selected for the communication from the second wireless device to the first wireless device, e.g., as the synchronization sequence may be selected based on different identification information than for the communication from the first wireless device to the second wireless device.

Alternatively, the same synchronization sequence may be selected for the communication from the second wireless device to the first wireless device, e.g., if the synchronization sequence is selected based on the same link identification information for the link between the first wireless device and the second wireless device.

Note that while the method of FIG. 5 primarily relates to narrowband P2P communication between two wireless devices, similar techniques may be used to establish and communicate according to any number of additional P2P connections between wireless devices. For example, either or both of the first wireless device and the second wireless device may utilize similar techniques to establish additional P2P connections with one or more other wireless devices in parallel with (and/or at a different time than) their P2P communication link with each other, and to communicate with those other wireless devices according to those additional P2P connections.

FIGS. 6-28 and Additional Information

FIGS. 6-28 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

A variety of frameworks and framework elements may be possible for D2D wireless communication, e.g., including wide- and narrowband implementations, implementations that utilize a synchronization master device for synchronization, and/or implementations that utilize a preamble-based approach to performing synchronization, among various possibilities. At least for some devices (e.g., in consideration of their transmit power regimes), propagation characteristics for narrowband communications may result in greater range capacity than wider-band communications. Note that effective communication range may be further increased, at least in some instances, if a lower-frequency communication band (e.g., 900 MHz unlicensed spectrum, as one possibility) is used for the narrowband D2D communications. As another possibility, some (e.g., lower complexity) devices may be configured to perform only narrowband communications (e.g., may have RF front end limitations, and/or may have battery limitations functionally limiting capability to perform wider-band communications). As yet another possibility, some devices, even if capable of both wideband and narrowband communication, may prefer to perform narrowband communication when possible, e.g., if the narrowband communication can reduce power consumption by the devices.

Accordingly, features for supporting narrowband (e.g., 180 kHz) D2D communications are described herein, at least according to some embodiments. The techniques described herein may be used in scenarios when one or more of the communicating wireless devices are not within communication range of a cellular base station (e.g., the devices may be out-of-coverage/OOC), according to some embodiments.

For example, Off Grid Radio Service (OGRS) is a system that is being developed to provide long range peer-to-peer (P2P)/D2D communication, e.g., in absence of a wide area network (WAN) or WLAN radio connection to support a variety of possible features. At least according to some embodiments, OGRS systems may support some or all of the features previously described herein with respect to FIG. 5.

According to some embodiments, OGRS may operate in unlicensed low ISM bands, e.g., between 700 MHz and 1

GHz, for extended range purposes, and may use one or multiple carriers of approximately 200 kHz. OGRS may be designed to meet the local spectrum regulatory requirements, such as channel duty cycle, operating frequencies, hopping pattern, LBT, maximum transmit power, and occupied bandwidth.

As one possibility for providing the physical narrowband carrier for narrowband D2D communications, a NB-IoT carrier may be used. According to some embodiments, NB-IoT carriers may be configured for use in standalone deployments (e.g., in a repurposed GSM band), guardband deployments (e.g., in a guardband frequency between LTE carriers), and inband deployments (e.g., within an LTE carrier). Alternatively, it may be possible to utilize a NB-IoT carrier in an unlicensed frequency band, e.g., in an OGRS context. In any of these possible deployment modes, NB-IoT carriers may include a variety of key features. For example, among various possible characteristics, NB-IoT carriers may support flexible timelines for control and data channels; peak rates of approximately 20 kbps in the downlink and 60 kbps in the uplink may be supported; single tone (e.g., 3.75 KHz vs. 15 KHz) and multi tone (15 kHz) uplink modulation, using pi/2 binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. Frequency hopping features for D2D communications may be supported. In some instances, NB-IoT carriers may provide coverage enhancement features for supporting coverage up to 20 dB.

Any of a variety of features may be included in an OGRS system, including when operating in regulated unlicensed spectrum, such as 900 MHz unlicensed spectrum. For example, frequency hopping spread spectrum (FHSS) may be used. Channel carrier frequencies may be separated by a minimum of 25 kHz, or the 20 dB bandwidth of the hopping channel, whichever is the greater. If the 20 dB bandwidth is less than 250 kHz (e.g., as may be the case if NB-IoT carriers are used), the system may use at least 50 channels. In this case, the average dwell time on a particular channel may not exceed 400 ms within a 20 second period (e.g., duty cycle <=2%), and/or transmit power may be limited to 30 dBm. If the 20 dB bandwidth is 250 kHz or greater, then the system may use at least 25 channels. In this case, the average dwell time may not exceed 400 ms within a 10 second period (e.g., duty cycle <=4%), and/or transmit power may be limited to 24 dBm. For example, the following table illustrates a possible set of specified features for OGRS operation depending on the 20 dB bandwidth of the hopping channels used:

| BW | #Channel | TX Power | On Time | Dwell Time |
|---|---|---|---|---|
| <250 KHz | >=50 | 30 dBm | 400 ms | 20 sec |
| >250 KHz | >=25 | 24 dBm | 400 ms | 10 sec |

Thus, if the 900 MHz unlicensed spectrum band (US ISM 900, 902-918 MHz) is used in conjunction with NB-IoT carriers (e.g., each having 200 kHz including guard bands), it may be possible to configure a pool of 80 frequencies, as one exemplary possibility. In another configuration, a pool of 130 frequencies spanning 902-928 MHz may be possible. Other frequency pools, e.g., having other numbers of frequencies available, are also possible. Various sets of those frequencies may be configured as "scan channels" and "page channels", which may be used for discovery and/or other purposes, if desired.

One possible approach to providing synchronization within a D2D communication framework may include a set of devices in a geographical area synchronizing to the symbol/subframe/frame timing and carrier frequency provided by one of the devices, which may be referred to as a synchronization master, as a 'global' synchronization source, or in any of various other manners. This approach may be similar in at least some ways to a cellular network in which wireless devices in a given area may camp on a base station, and may also be referred to herein as a 'global' synchronization approach.

Conceptually, a D2D communication service may be able to enable communication between any two wireless devices as long as the devices can communicatively reach each other according to the geographical distance between them. However, such a global synchronization approach may result in devices' coverage range being limited by the synchronization master's range, such that it may be possible for two devices to not be able to communicate despite being within communication range from each other if one is within the sync master's range and the other is out of the sync master's range. Even if a sync relay system is used to extend the range of a D2D group, practical sync hop limits (e.g., 2, or any other sync hop limit) may still result in a node's discovery range being restricted to the sync range, such that two devices in close proximity may still not be able to communicate, e.g., near the boundary of a relay master.

Further, it may also be possible for two devices to be within communication range from each other, but to be synchronized to different sync masters with different synchronization schemes. For example, nodes synchronized to masters with different timing sources (e.g., GNSS vs. non-GNSS, or non-GNSS vs. non-GNSS) may not be able to communicate with each other despite being within geographical range.

Such an approach may also suffer from inconsistent and/or substantial P2P connection setup delays. For example, even though two devices might be in close proximity to each other, they might experience a relatively long connection setup delay, if they are at the edge of the coverage provided by a sync master, e.g., due to longer synchronization time.

Additionally, such an approach may result in an additional power consumption burden upon the device selected to be the synchronization master, e.g., since it may be expected to transmit synchronization reference signals at a high power level to provide a maximum possible range for the D2D communication group. Such a burden may be distributed among devices, e.g., by rotating the sync master position among devices. However, this may introduce communication interruptions, extend connection setup delay/discovery latency among devices, require a more complex synchronization system design in order to provide for event driven and/or periodic triggered master/relay selection/re-selection/handover between different sync sources, and/or have potential for instability due to such a complex multi-tier sync design. Further, relying on an unrelated sync master device to provide synchronization introduces an additional possible source for potential unexpected behavior that could affect D2D communication between a pair of devices.

Still further, such a system may have a potentially substantial likelihood for collisions during discovery, e.g., since many devices may sync to the same timing and frequency scheme provided by a sync master.

Figure 6:
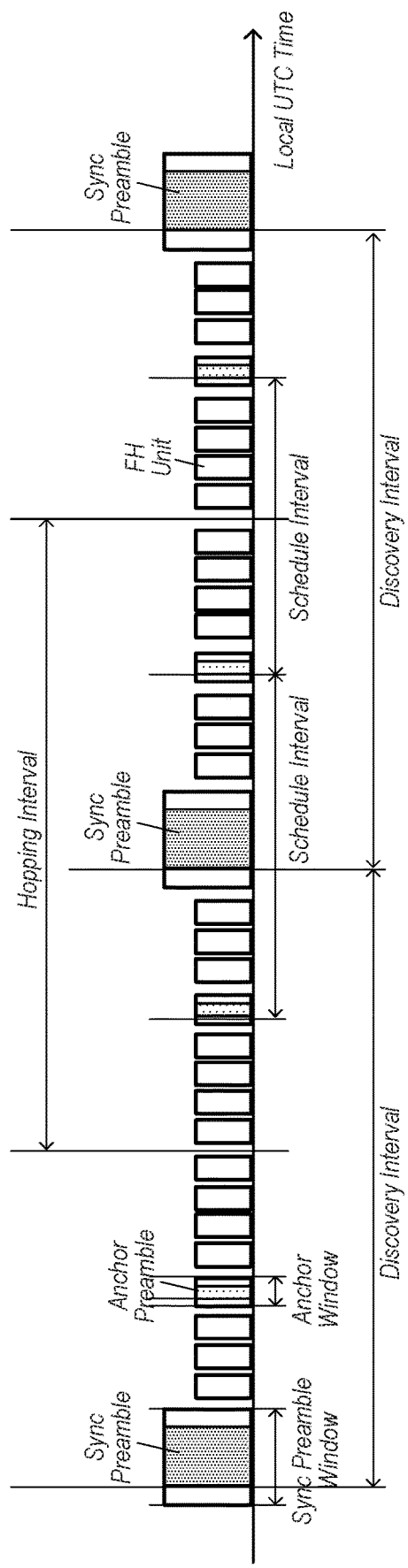
FIG. 6 illustrates possible timing of various aspects of an exemplary possible preamble based narrowband device-to-device communication framework, according to some embodiments.

Accordingly, as a possible alternative, a D2D communication framework utilizing a synchronization scheme that does not rely on a sync master device to provide synchronization signals for an entire D2D communication group may be used, at least according to some embodiments described herein. For example, a preamble-based approach to performing synchronization for narrowband D2D wireless communication may be used. FIG. 6 illustrates possible timing of various aspects of such an exemplary preamble based narrowband D2D communication framework, according to some embodiments.

According to such a framework, a discovery window may be preserved by each wireless device for receiving synchronization sequences from other devices. Devices utilizing such a framework may refer to coordinated universal time (UTC) (e.g., as acquired via global navigational satellite system (GNSS) capability or in any of various other ways) or another specified common reference clock to determine when each discovery window occurs, at least according to some embodiments.

Each preamble transmission (which may include one or more synchronization sequences) may be associated with device identification information, in some instances. For example, if a first device wants to establish a link with a second device, it may transmit a preamble including a synchronization sequence that is determined by and associated with (at least partial) identification information for the second device. The preamble may be followed by one or more other (e.g., discovery related) messages. When the second device detects the presence of this preamble (e.g., that is associated with at least partial identification information for the second device), the second device may continue to receive the following messages to proceed with discovery and link establishment.

Additionally or alternatively, in some instances (e.g., once link establishment has occurred), the synchronization sequence used during preamble transmission may be selected based at least in part on link identification information for a link associated with the preamble transmission. For example, once the first device and the second device have performed link establishment and established a link identifier for the link between the first device and the second device, control and/or data communications between the first device and the second device may utilize a preamble that includes a synchronization sequence selected based at least in part on the link identifier.

As shown, the example framework of FIG. 6 may further define hopping intervals (e.g., for coordinating frequency hopping pattern usage), anchor windows (e.g., for anchoring communications between devices that have established a link), and schedule intervals (e.g., for managing scheduling communications between devices that have established a link), among various possible framework elements. Additionally as shown, various frequency hopping (FH) units may be configured, which may define a time unit for frequency hopping within a hopping interval. Note that while FIG. 6 is intended to be illustrative of several possible framework elements of one possible example framework for preamble-based narrowband D2D communication, numerous other framework elements could additionally or alternatively be used, as desired.

Any of various synchronization signal designs and design elements may be used in conjunction with such device-to-device communications (as well as in conjunction with other possible types of wireless communications). Time and frequency synchronization may be needed for most communication systems due to two error sources: timing error and frequency error. Thus, the end objectives of synchronization may include finding: symbol and subframe/frame timing; and carrier frequency offset. A typical procedure of synchronization can involve: coarse timing estimation; frequency acquisition; fine timing and tracking; and frequency tracking.

In D2D communication, synchronization can be attained by sending synchronization signals from one device to one or more other devices. A synchronization signal/sequence may be a known sequence/pattern that has good correlation properties. For example, it may be important for a synchronization sequence to have sharp auto correlation to attain good timing offset and frequency offset detection performance. It may also be important for different sequences among a set of possible sequences available for use to have low cross correlation, e.g., to minimize interference among different sequences during multiuser transmission.

Any of various possible metrics may be used to help achieve such properties when selecting synchronization sequence design characteristics, according to various embodiments. As one such possibility, peak-to-sidelobe ratio and maximum cross correlation may be used as metrics to consider as part of synchronization sequence design.

According to some embodiments, for a received signal:

$$\vec{y}(\tau) = \vec{a}(\tau) + \beta \cdot \vec{b}(\tau,\Delta) + \vec{n}$$

and a correlator:

$$z(\tau) = \frac{\vec{a}^H(0)\vec{y}(\tau)}{N} = A_\tau + \beta C_{\tau,\Delta} + \tilde{n},$$

the mean and variance of the synchronization determination metric may be as follows:

$$\mu_X = |A_\tau|^2 + \beta^2 |C_{\tau,\Delta}|^2 + 2\mathrm{Re}(\beta A_\tau C_{\tau,\Delta}^*) + \frac{\sigma^2}{N}$$

$$\sigma_X^2 = \frac{\sigma^4}{N^2} + |A_\tau + \beta C_{\tau,\Delta}|^2 \frac{2\sigma^2}{N}$$

Within such expressions, the term $|A_\tau|^2$ may be representative of auto correlation, such that it may be desirable to make synchronization sequence design choices to maximize the value of this term, while the term $|C_{\tau,\Delta}|^2$ may be representative of cross correlation, such that it may be desirable to make synchronization sequence design choices to minimize the value of this term, to the degree possible.

A local copy of such a signal may be used to correlate with the received signal in both time and frequency. Time domain correlation may be done via sliding window of scalar product between the local copy and the received signal with a certain delay. Frequency domain may use multiple carrier frequency offset (CFO) hypotheses. When the delay and CFO match the actual values, a peak in the correlation can be detected, so that the corresponding CFO and delay can be treated as the true values.

Figure 7:
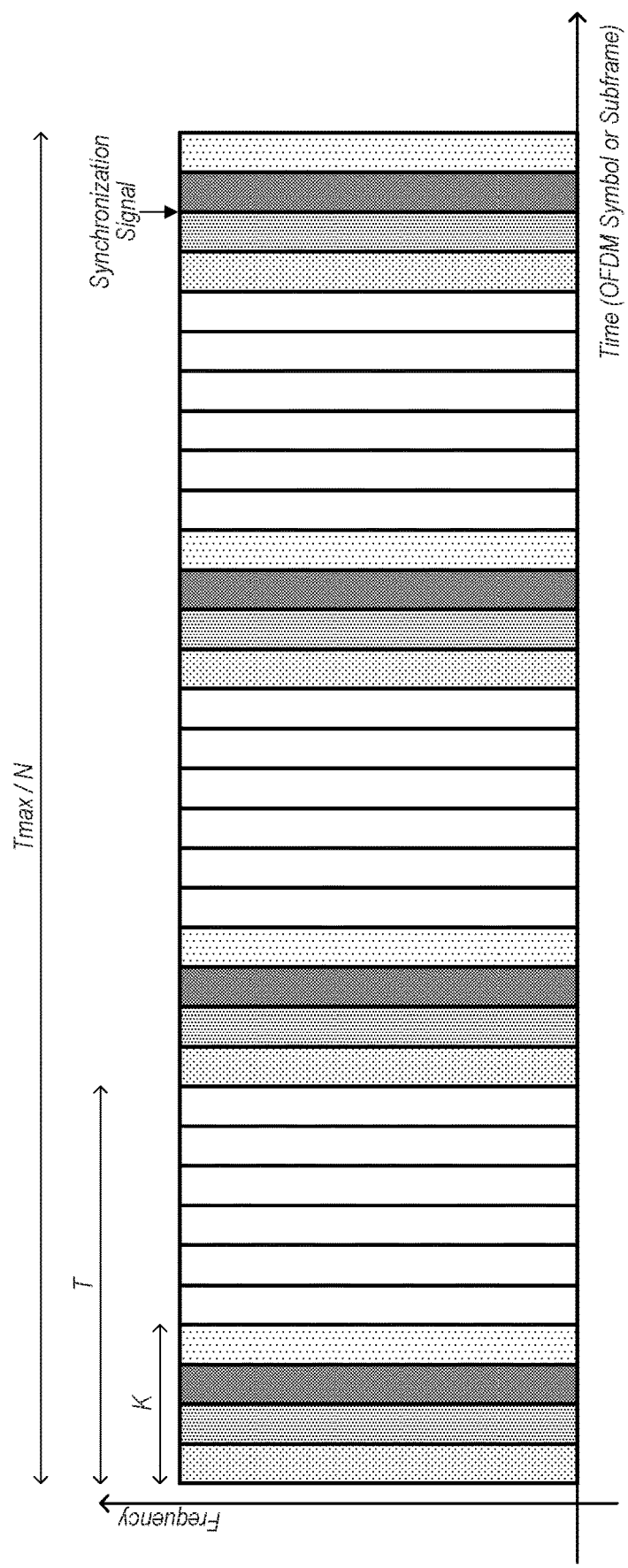
FIGS. 7-12 illustrate various possible synchronization signal design elements and parameters that could be used in a preamble based narrowband device-to-device communication framework, according to some embodiments.

FIG. 7 illustrates various possible synchronization signal design parameters that could be used, according to some embodiments. As shown, the time domain pattern of a possible synchronization signal may be characterized by K, T, Tmax, and/or N. K may represent the number of synchronization signal bursts in one cycle. Note that the sequence/signal in each time unit (e.g., OFDM symbol or subframe) may be different according to design. T may represent a burst period where every T time units there are K continuous time units that carry the synchronization signal. Tmax may represent a duration of the synchronization signal during one transmission, or equivalently, N may represent a number of bursts during one transmission.

Figure 8:
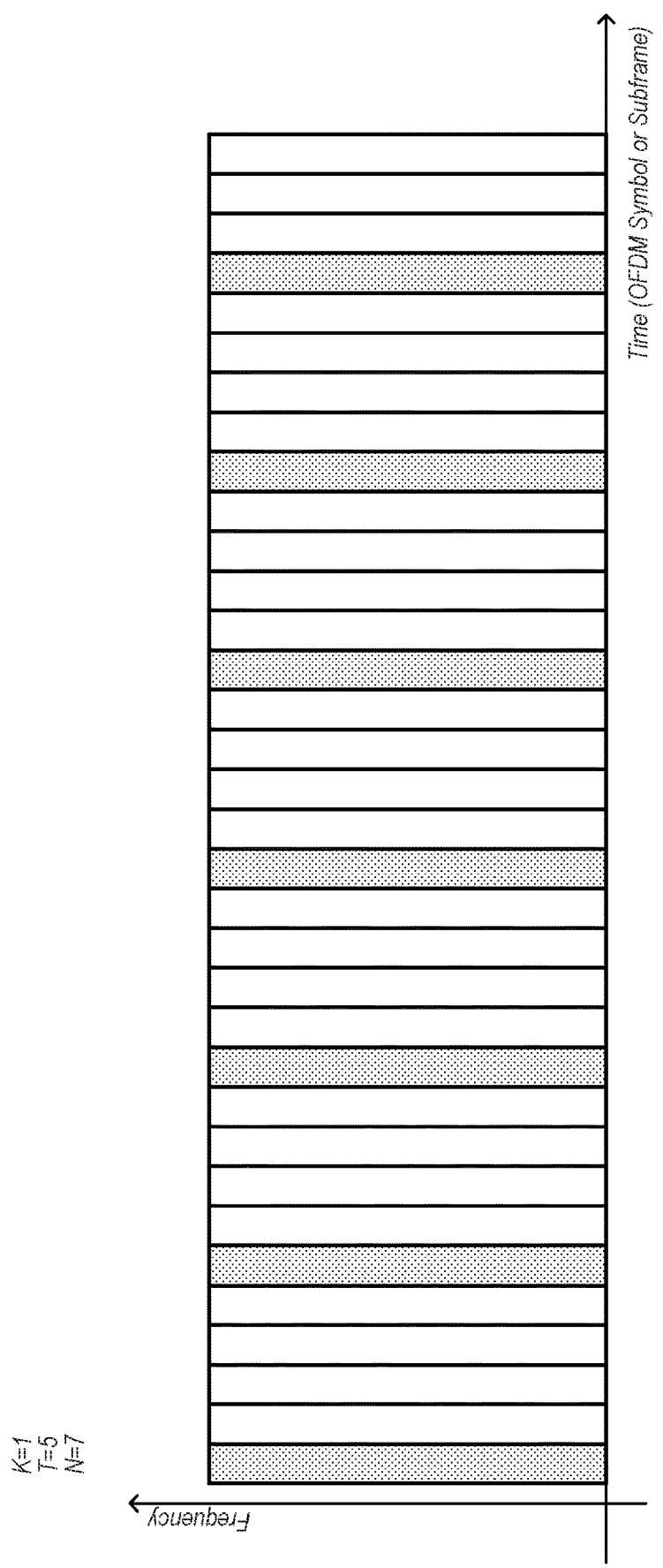
Figure 9:
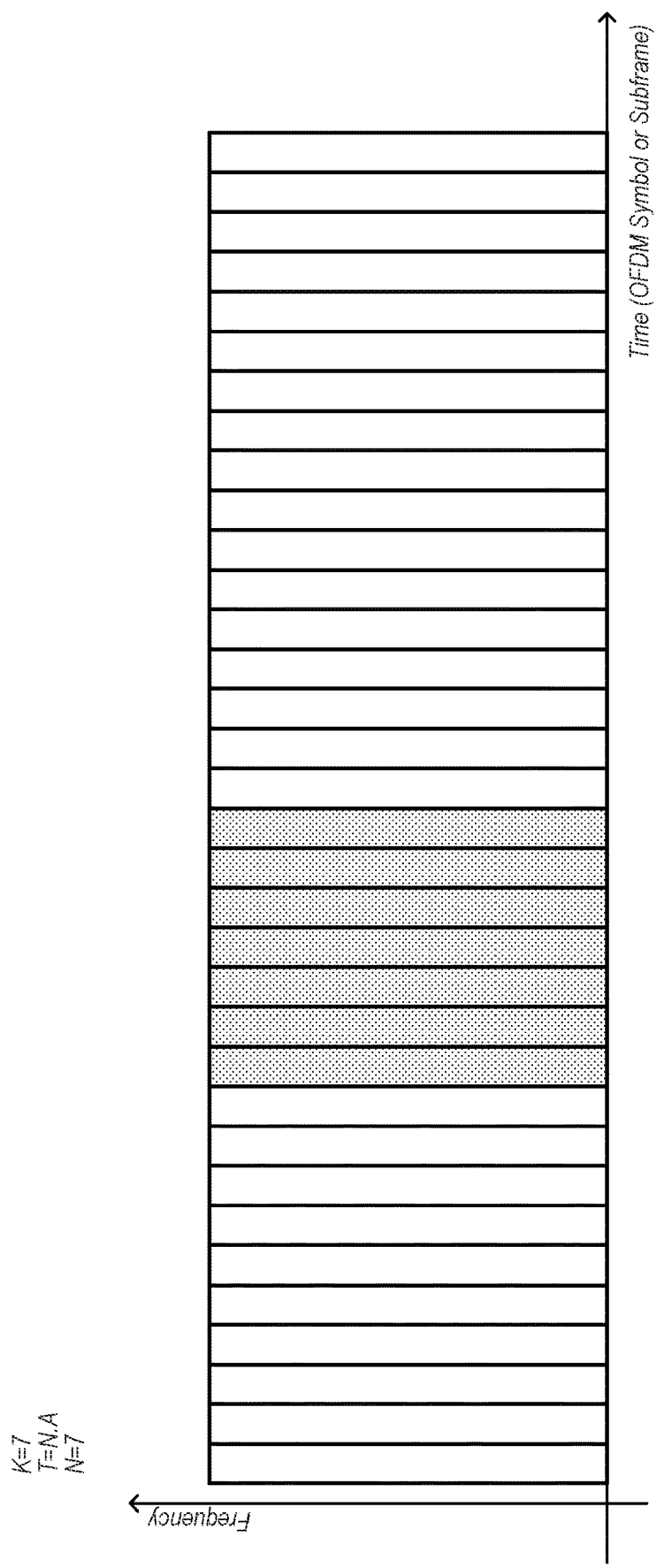

FIGS. 8-9 illustrate possible example time domain patterns of synchronization signals using different example values for the parameters K, T, and N. FIG. 8 illustrates an example in which K=1, T=5, and N=7. FIG. 9 illustrates an example in which K=7, T is not applicable (e.g., as all repetitions are provided contiguously in time), and N=7.

In many cases, a single burst or a single sync signal may not be sufficient to attain synchronization, e.g., due to unreliable correlation estimation at low SNR. Accordingly, in some instances, combining multiple sync signals (within a burst) and/or combining across bursts may be used. At least two ways of correlation combining may be available: coherent combining and non-coherent combining. In coherent combining, a scalar product (each corresponding to a different delay) between the local copy and received copy is accumulated as a complex number over time. In non-coherent combining, the absolute value of the scalar product (each corresponding to a different delay) is accumulated over time. Coherent combining may mitigate noise more effectively in comparison with non-coherent combining in some instances, however, it may be subject to channel time variation, clock time drift, etc., in some instances. Non-coherent combining may be more robust to channel time variation and clock time drift, yet may provide less noise suppression, in some instances. Therefore, by choosing K and T properly, it may be possible to improve the performance given certain channel conditions and requirements, at least according to some embodiments.

For example, given certain channel conditions, e.g., coherent time, the value K can be chosen to be well within the coherent time, so that the coherent combining can be effective. On the other hand, the value T may be chosen by considering time diversity and synchronization delay. For time diversity, T may be selected to be sufficiently large (e.g., >coherent time) so that time domain diversity can be captured. For synchronization delay, T may be selected to not be so large as to cause synchronization delay if combining across multiple bursts is needed. So, within a burst, coherent combining may be used (e.g., one correlation function with different delays may be generated), and across bursts, non-coherent combining may be used (e.g., the absolute values of the correlation coefficients may be added across bursts).

Figure 10:
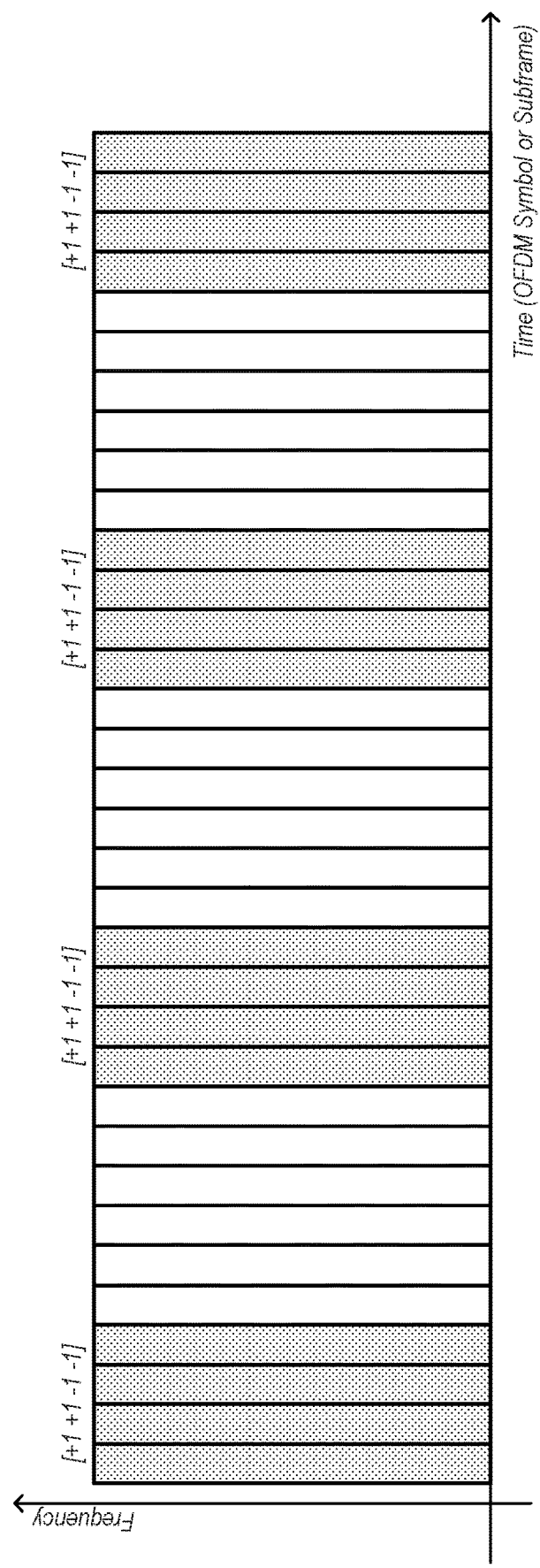

FIG. 10 illustrates aspects of one possible synchronization signal design. In this example, bursts may be identical to each other where within each burst a same base synchronization sequence may be used in frequency for all K time units. Further, it may be assumed that there are N subcarriers available in frequency to transmit the basis sequence. The length of the basis sequence may be N. The basis sequence can be a Zadoff-Chu (ZC) sequence or a M-sequence, among various possibilities. A cover code of length K may be multiplied onto the basis sequence, e.g., where the cover code takes the value {−1, 1} at different time units, as illustrated in FIG. 10. As an alternative, the cover code can be a length K M-sequence. In another example, the cover code can vary from burst to burst, e.g., according to a predetermined pattern.

Figure 11:
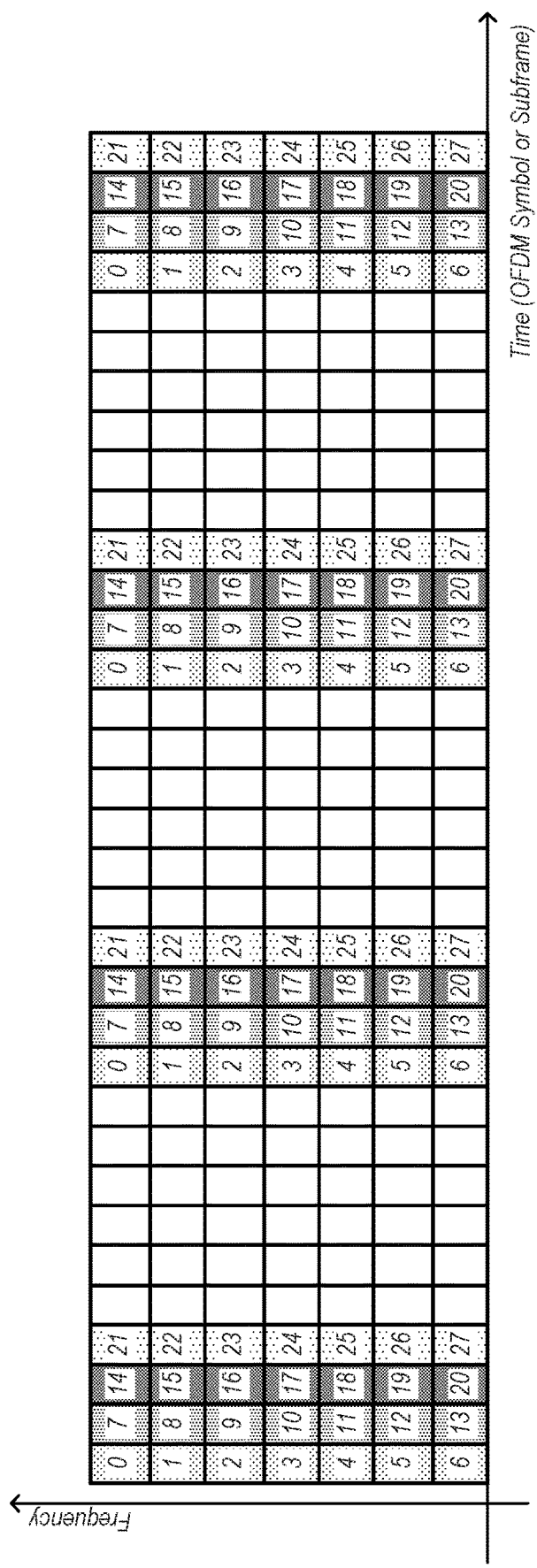

FIG. 11 illustrates aspects of another possible synchronization signal design. In this example, the sequence/signal in a burst may be derived from a long sequence (e.g., with length K*N). In an alternative, a K*N length sequence may first be mapped/transmitted on frequency domain and then transmitted on time domain. As shown in FIG. 11, each illustrated number corresponds to a sequence index. As one possible advantage, a long sequence may provide superior correlation performance.

Figure 12:
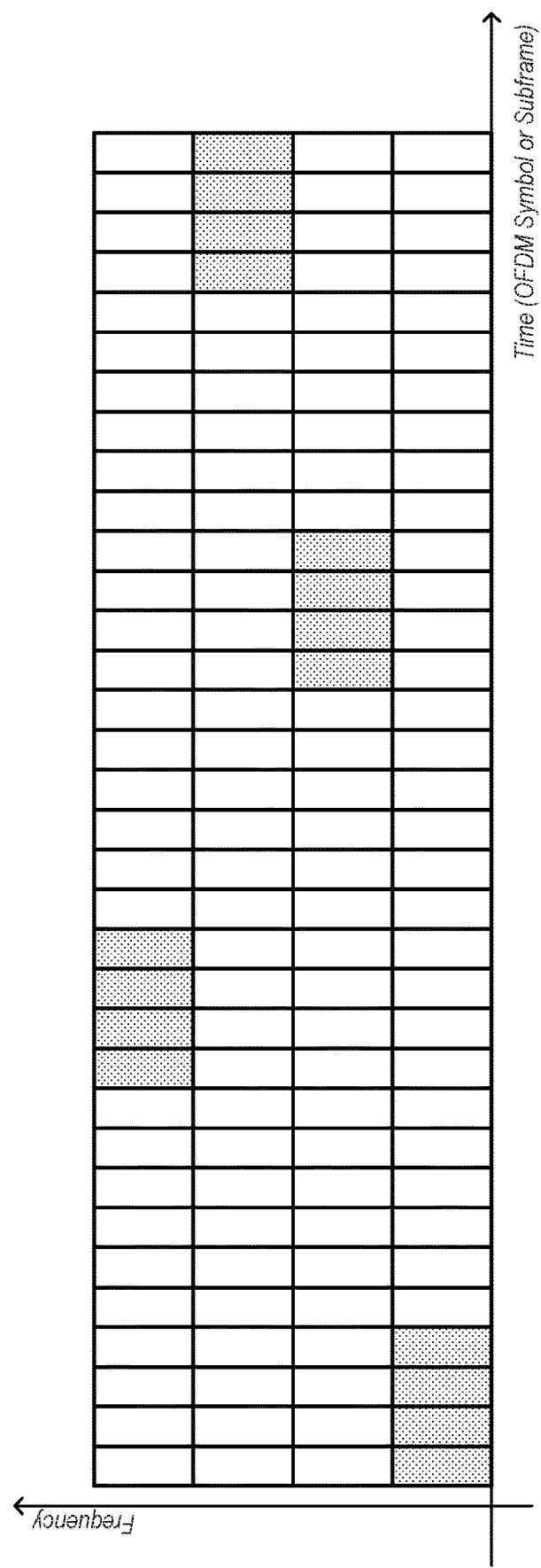

FIG. 12 illustrates aspects of still further possible synchronization signal design. In this example, a predetermined frequency hopping pattern can be applied on top of one of the designs of FIGS. 10-11, e.g., to capture frequency diversity. The frequency-hopping pattern can be UE-specifically configured, which may also help reduce sync signal collisions.

As previously noted herein, at least in some instances, it may be desirable to provide a pool of possible synchronization sequences such that each sequence has high auto correlation and the various sequences have low cross correlation with each other. However, at least in some instances, there may be a tradeoff between auto correlation and cross correlation, such that given a certain sequence length, it may not be possible to make sidelobes in the auto correlation and cross correlation arbitrarily low at the same time.

Further, it may also be useful to consider detection complexity when designing a pool of possible synchronization sequences. For example, to keep the detection complexity manageable, certain structure constraints may be imposed.

As one possible exemplary target, it may be desirable to attempt to achieve a >90% detection rate at 163 dB MCL (−17 dB), with reliable detection in multi-sequence interference scenarios (e.g., up to 17 dB interference), and with as many sequences as possible, e.g., to reduce sequence collision rate. For example, consider a framework in which 16 bit pair ID to sequence mapping (e.g., which may be a many-to-one mapping) is used. In such a scenario, with 512 sequences, among 30 active UEs, there may be a 58% probability that two may have a same sequence. With 14080 sequences, with 30 active UEs, there may be a 3% probability that two may have a same sequence, and with 100 active UEs, there may be a 30% probability that two may have a same sequence. Thus, increasing the number of possible sequences may substantially reduce the likelihood of multiple IDs being mapped to the same sequence.

Figure 13:
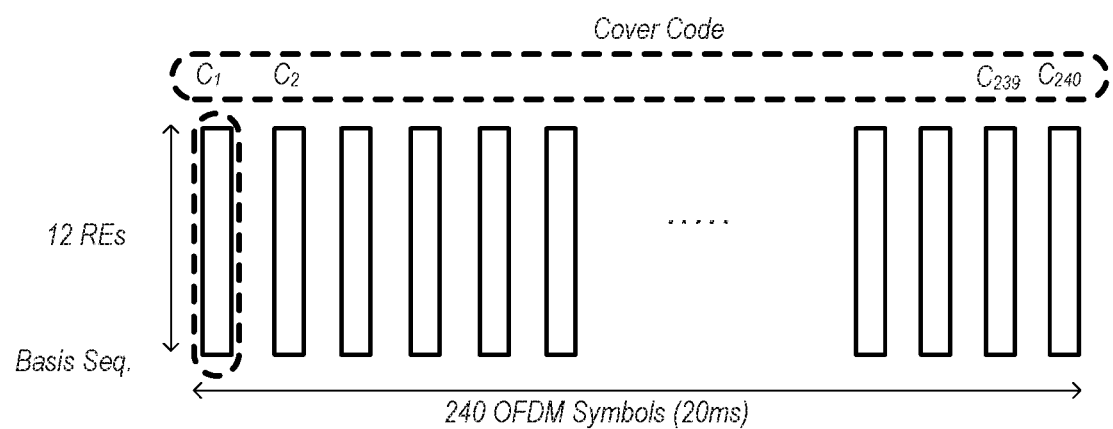
FIGS. 13-24 illustrate various aspects of various examples of possible synchronization sequence designs that could be used in a preamble based narrowband device-to-device communication framework, according to some embodiments.

FIG. 13 illustrates aspects of an exemplary possible synchronization sequence design that could be used in a preamble based narrowband device-to-device communication framework, according to some embodiments. As shown, each sequence may include a basis sequence and a cover code.

Figure 14:
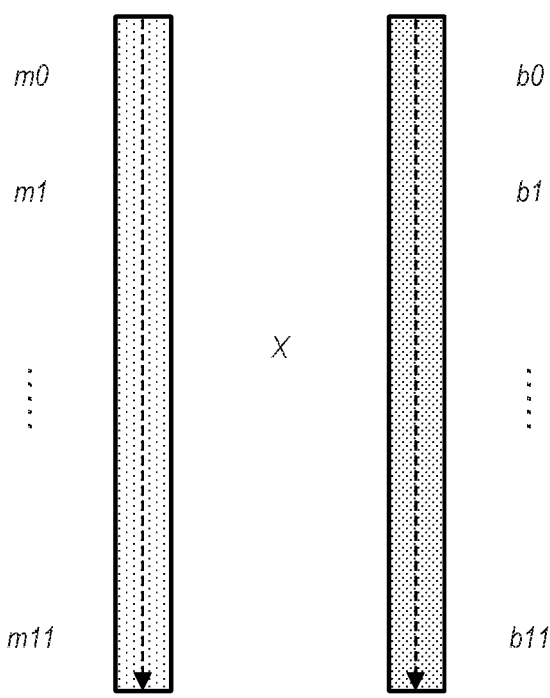
Figure 15:
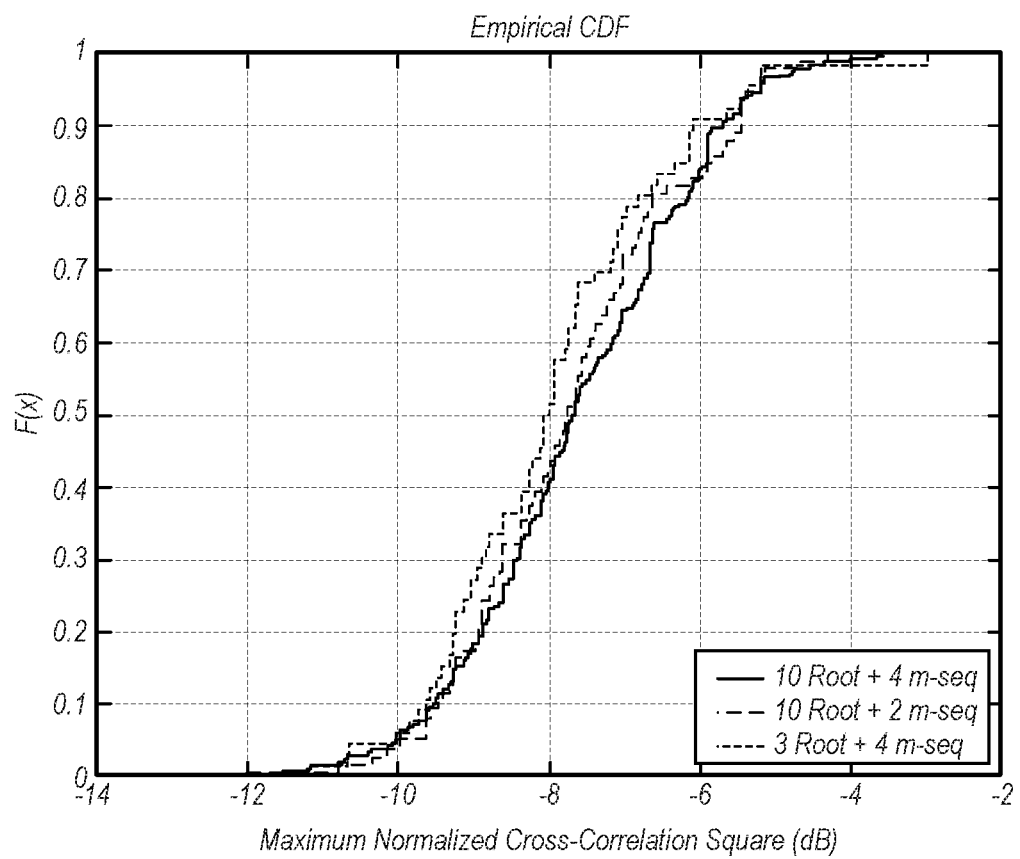

In the example of FIG. 13, the basis sequence may span 12 subcarriers and 1 OFDM symbol, with a total synchronization sequence length of 240 OFDM symbols (e.g., 20 ms). If desired, the set of possible basis sequences may be generated by using decimated (e.g., $2^n$) M-sequences multiplied with ZC sequences, e.g., to provide a large sequence set with relatively low cross correlation, such as illustrated in FIG. 14. FIG. 15 illustrates a possible cumulative distribution function (CDF) of the maximum normalized cross correlation square (in dB) for various such ZC root+M-sequence combinations (e.g, 10 root+4 M-seq, 10 root+2 M-seq, 3 root+4 M-seq), according to some embodiments.

Figure 16:
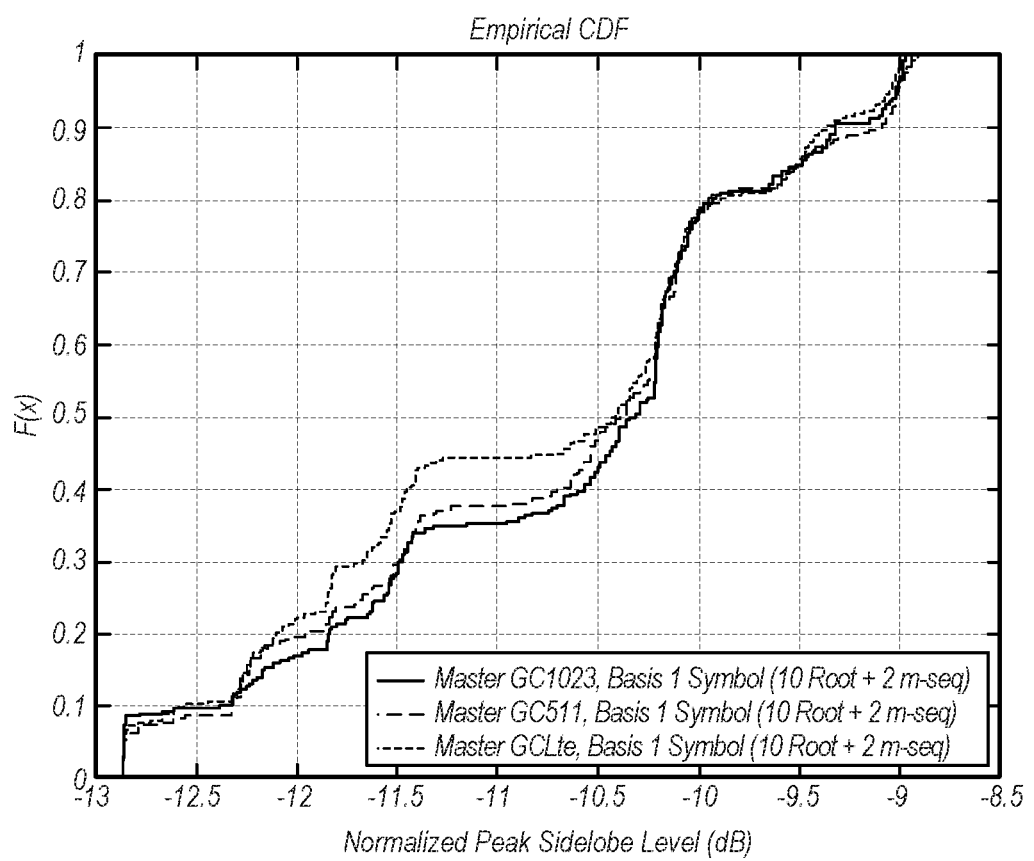
Figure 17:
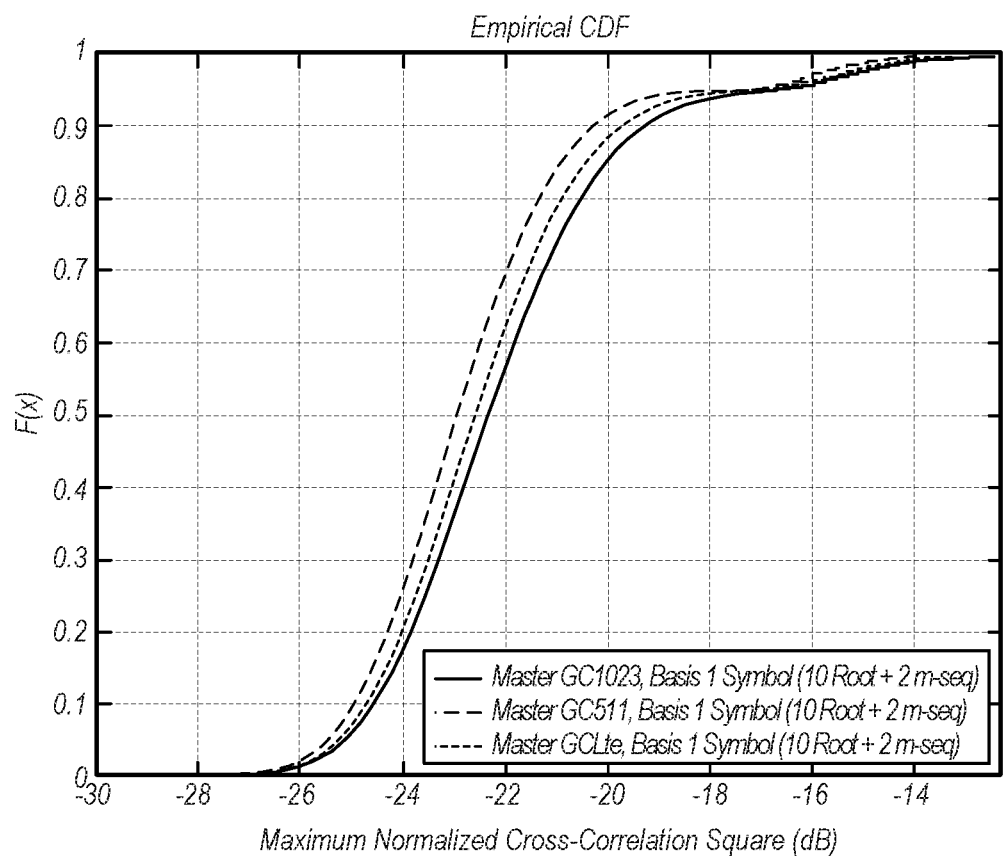

The set of possible cover codes for such a design could be generated by truncating one or more Gold codes to the desired sequence length. FIGS. 16-17 illustrate possible CDFs of the normalized peak sidelobe level (in dB), and the maximum normalized cross correlation square (in dB), respectively, for such a ZC root+M-sequence combination with various possible sets of cover codes that are based on different Gold code truncation approaches (e.g., truncated 511 length GC, truncated 1023 GC, truncated $2^{31}-1$ GC).

At least in some instances, it may be possible to obtain 20440 (e.g., 40×511) sequences with maximum cross correlation of approximately −23 dB at the 50th percentile and approximately −20.5 dB at the 90th percentile using such a design.

Figure 18:
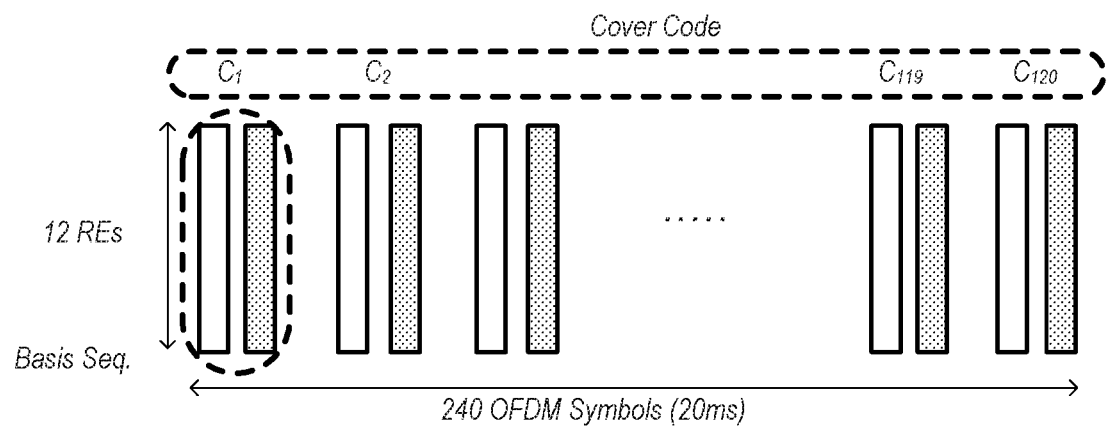

FIG. 18 illustrates aspects of another exemplary possible synchronization sequence design that could be used in a preamble based narrowband device-to-device communication framework, according to some embodiments. As shown, each sequence may include a basis sequence and a cover code.

Figure 19:
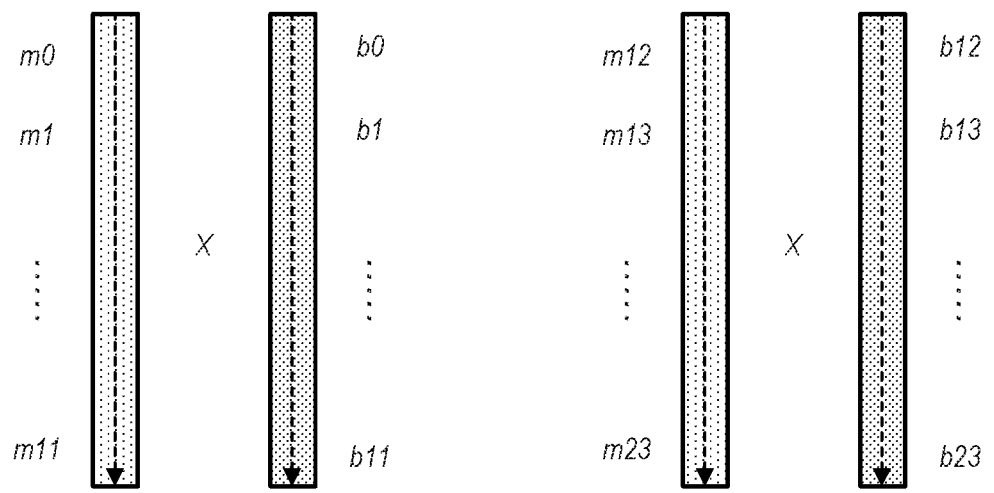
Figure 20:
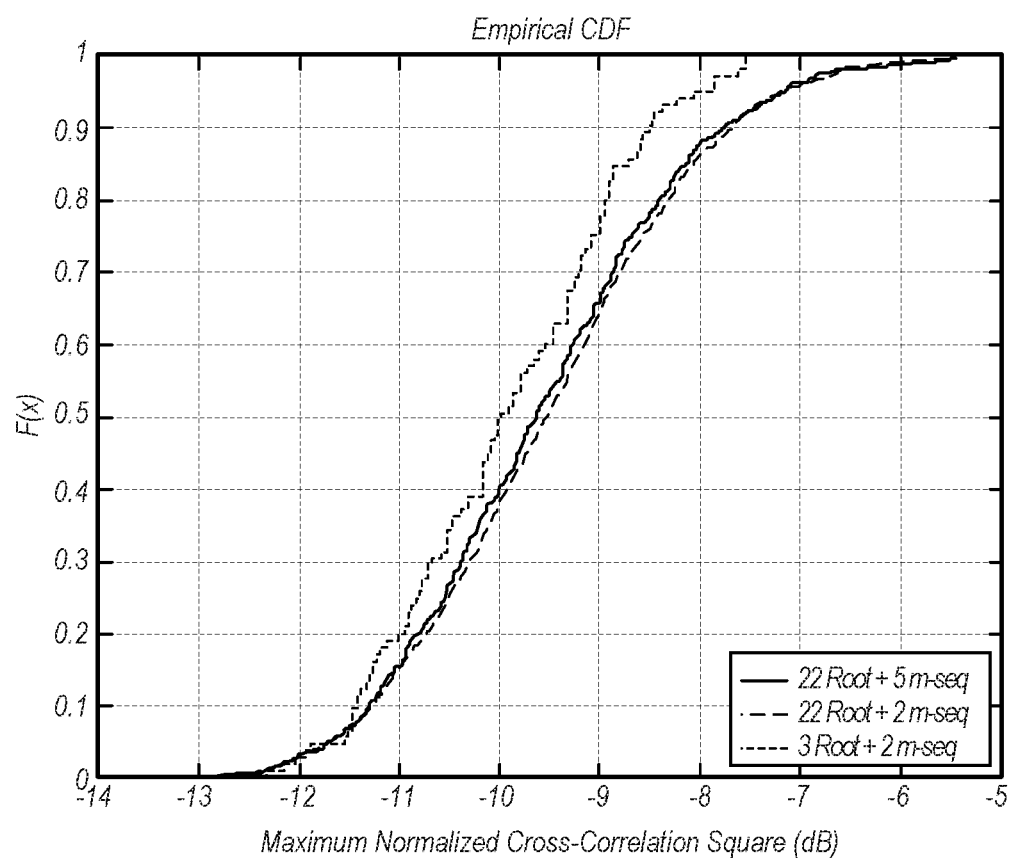

In the example of FIG. 18, the basis sequence may span 12 subcarriers and 2 OFDM symbols, with a total synchronization sequence length of 240 OFDM symbols (e.g., 20 ms). If desired, each basis sequence of the set of possible basis sequences may be generated as a product of a M-sequence and a ZC sequences, such as illustrated in FIG. 19. FIG. 20 illustrates a possible cumulative distribution function (CDF) of the maximum normalized cross correlation square (in dB) for various such ZC root+M-sequence combinations (e.g, 22 root+5 M-seq, 22 root+2 M-seq, 3 root+2 M-seq), according to some embodiments.

Figure 21:
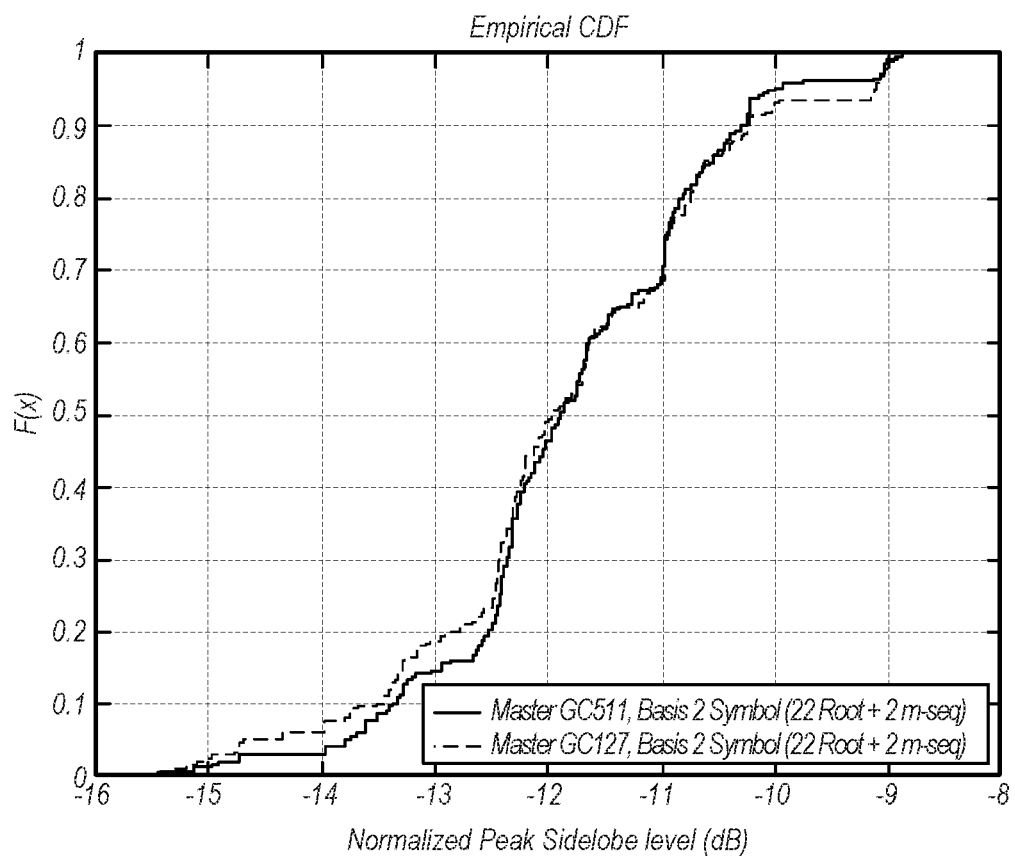
Figure 22:
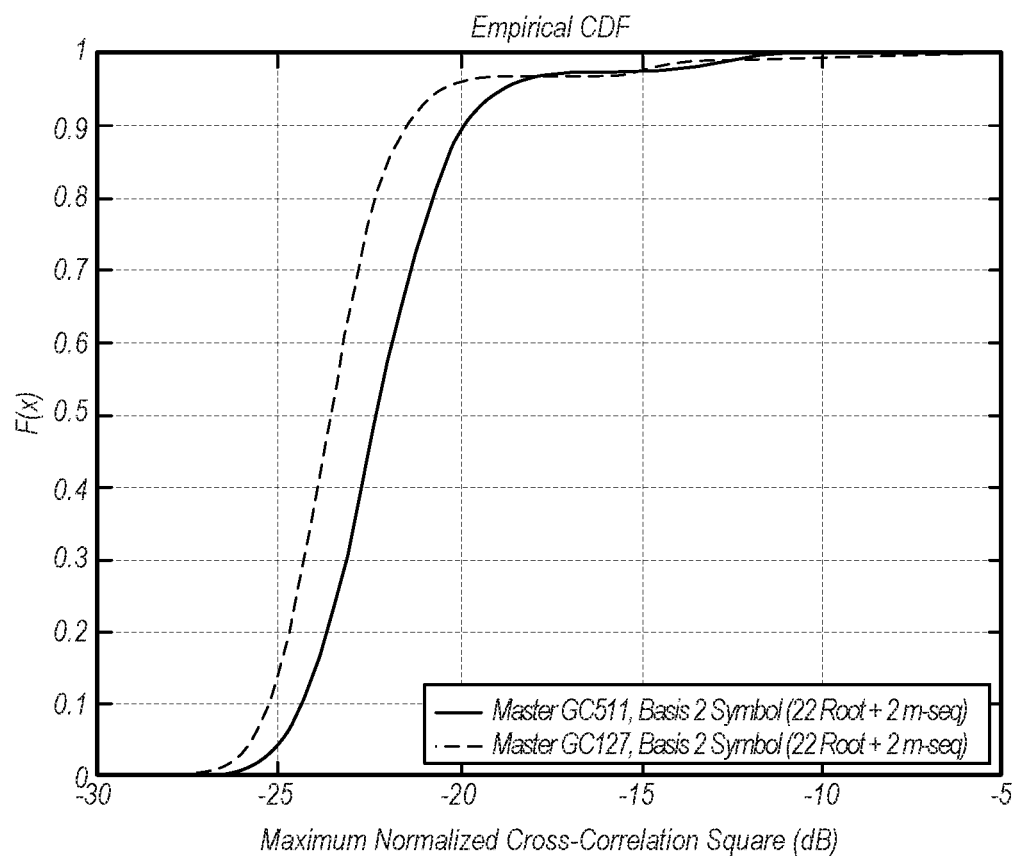

Similar to the previous example, the set of possible cover codes for such a design could be generated by truncating one or more Gold codes to the desired sequence length. FIGS. 21-22 illustrate possible CDFs of the normalized peak sidelobe level (in dB), and the maximum normalized cross correlation square (in dB), respectively, for such a ZC root+M-sequence combination with various possible sets of cover codes that are based on different Gold code truncation approaches (e.g., truncated 127 length GC, truncated 511 GC).

At least in some instances, it may be possible to obtain 14080 (e.g., 110×128) sequences with maximum cross correlation of approximately −24 dB at the 50th percentile and approximately −22 dB at the 90th percentile using such a design.

Figure 23:
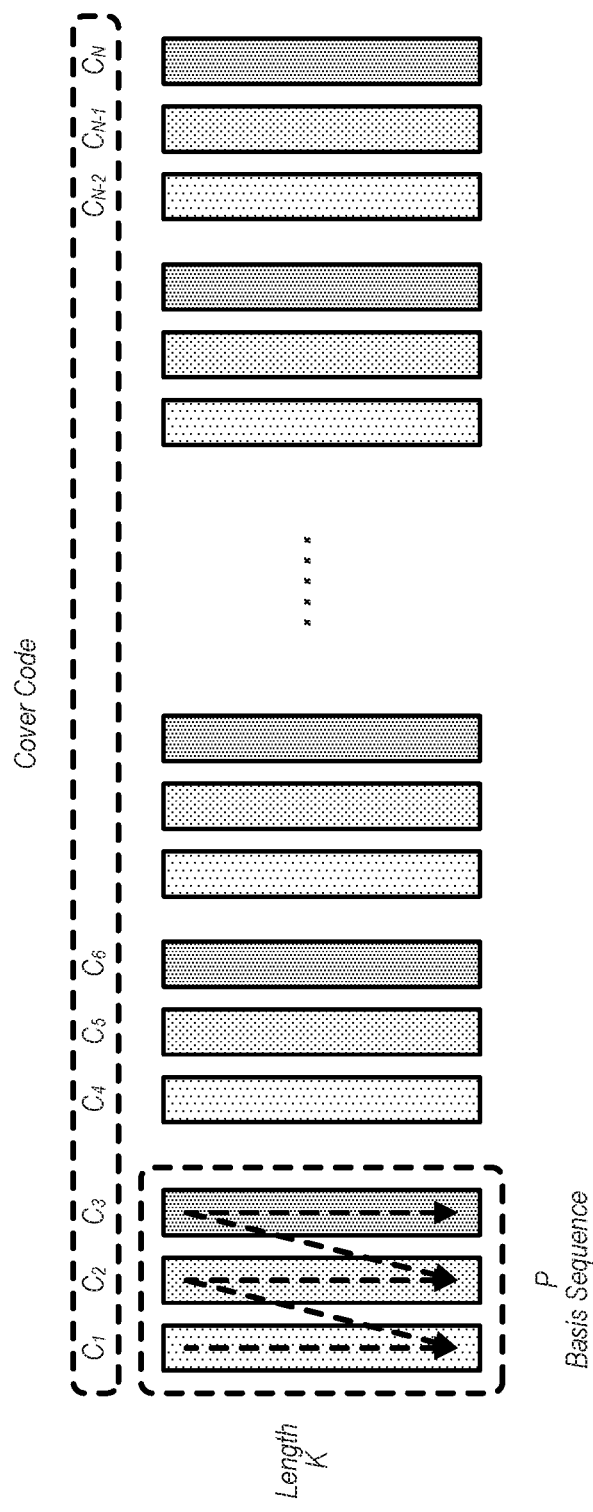

FIG. 23 illustrates a more generalized possible synchronization sequence design that could be used in a preamble based narrowband device-to-device communication framework, according to some embodiments. As shown, each sequence may include a basis sequence and a cover code.

The basis sequence may be a sequence of length K×P, where K represents the frequency resources (e.g., the narrowband frequency channel width, such as a 180 kHz channel including 12 15 kHz subcarriers, as one possibility) available for the basis sequence, and P represents the time resources (e.g., the number of OFDM subcarriers) available for the basis sequence. As shown, the basis sequence may span multiple OFDM symbols, at least according to some embodiments. For example, 3 OFDM symbols may be used (e.g., as shown), or 2 OFDM symbols (e.g., as in the example of FIG. 18), or 1 OFDM symbol (e.g., as in the example of FIG. 13), or any other desired number of OFDM symbols.

At least according to some embodiments, designing basis sequences such that they span multiple OFDM symbols may improve the correlation properties of the synchronization sequences that include those basis sequences. For example, in a narrowband D2D communication framework in which the frequency resources K are limited to a relatively narrow frequency channel, extending the time-duration of each basis sequence may be the only practical means of extending the total possible length of each basis sequence. A larger pool of basis sequences may in turn be possible given a longer basis sequence length. Selecting a candidate pool of basis sequences from such a larger pool of basis sequences reduce the likelihood of collisions (e.g., as a greater total number of synchronization sequences may be possible), and/or may allow for a set of those basis sequences having the best correlation properties to be chosen for the candidate pool of basis sequences the pool of possible basis sequences of the desired length.

As one possibility, basis sequences may be based on Zadoff-Chu (ZC) sequences that are truncated or extended to the length K×P. As another possibility, basis sequences may be based on a combination of ZC and M-sequences that are truncated or extended to the length K×P. As still another possibility, basis sequences may be based on a combination of ZC sequences and Gold codes that are truncated or extended to the length K×P. Any number of other options may also or alternatively be used, as desired.

The synchronization sequence may include multiple repetitions of the basis sequence, e.g., to extend the synchronization sequence to a desired temporal length. Providing a relatively large number of such repetitions may improve the detectability of the synchronization sequence, e.g., in marginal signal conditions, and/or may effectively increase the pool of possible cover codes that could be used in conjunction with each possible basis sequence.

The cover code may be a binary sequence from {+1,−1} of length N. As one possibility, cover codes may be based on Gold codes that are truncated or extended to the desired length N. The cover code may be applied such that each OFDM symbol of the synchronization sequence is multiplied by a cover bit of the cover code, e.g., as shown, as one possibility. As another possibility, each repetition of the basis sequence (e.g., encompassing multiple OFDM symbols) of the synchronization sequence may be multiplied by a cover bit of the cover code. Any number of other options may also or alternatively be used, as desired.

Figure 24:
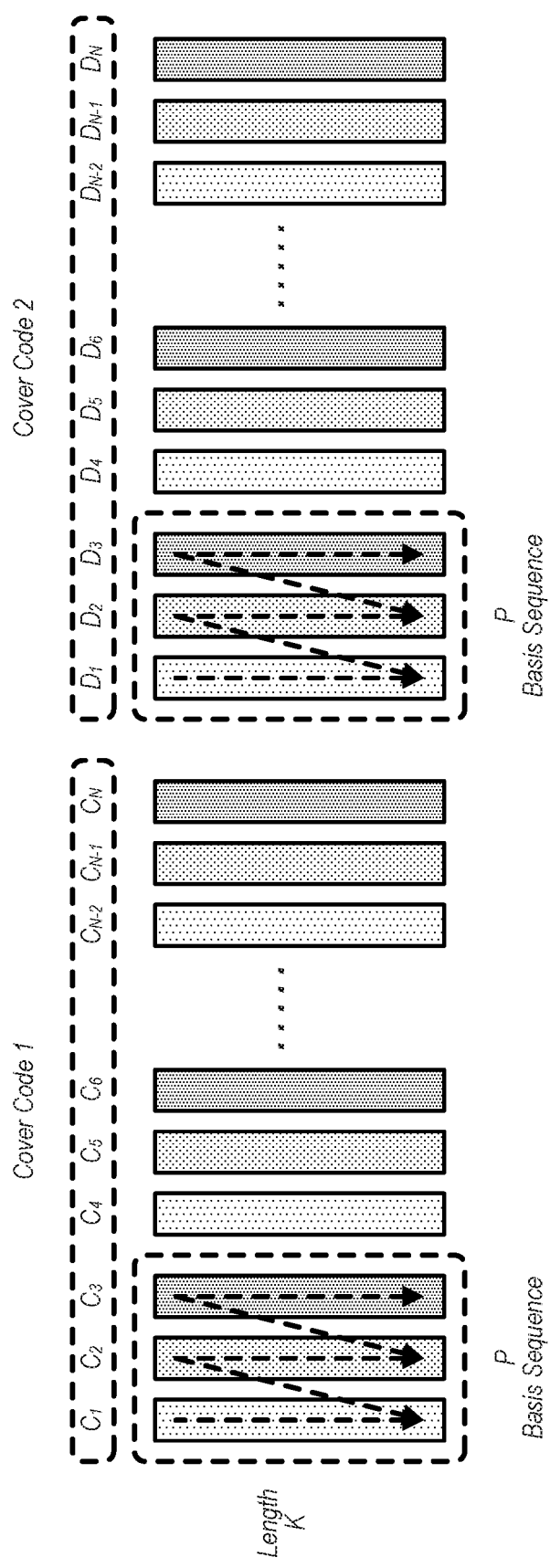

It may be possible to cascade sequences in a synchronization preamble (or, considered another way, to cascade multiple synchronization preambles each including a synchronization sequence), e.g., as shown in FIG. 24, such that multiple synchronization sequences may be used in a given synchronization preamble transmission. This may significantly increase the candidate pool for unique preamble transmissions (e.g., from 511 to 511×511, if two sequences are selected from a pool of 511 sequences for each preamble, or from 128 to 128×128, if two sequences are selected from a pool of 128 sequences for each preamble, among various possibilities), and accordingly potentially significantly reduce the likelihood of collisions in a communication system using such an approach. It should be noted that while the synchronization sequences illustrated in FIG. 24 may have similar parameters (e.g., similar basis sequence length, cover code length, and total length), any or all of such parameters may differ between different synchronization sequences included in a synchronization preamble (and/or between different synchronization sequences included in cascaded synchronization preambles), at least according to some embodiments. There may be a gap between two or more such cascaded sequences/preambles, if desired, e.g., to allow for early determination of successful decoding of the synchronization preamble transmission based on an initial portion of the preamble transmission by the receiver.

Figure 25:
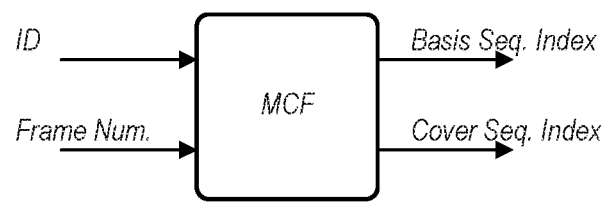
FIG. 25 illustrates an example technique that could be used for performing synchronization sequence selection, according to some embodiments.

If desired, when a ZC sequence is used as a basis sequence, the root can vary according to a predetermined sequence, which may be UE-specific. This may help to prevent collisions. As another possibility, a UE ID or a link ID can be mapped to a set of N sequences using a set of formulas that maps the ID (or a portion of the ID) to each of a basis sequence index and a cover code index. In some instances, the local frame number for the transmitting UE may also be used as an input to determine the synchronization sequence components. Thus, as illustrated in FIG. 25, a UE may calculate a sequence mapping and frame hopping function based on its ID and local frame number. A maximum contention free (MCF) polynomial may be used to minimize collisions. If desired, different portions of the ID may be mapped to each of the basis sequence and the cover code, or the ID may be mapped to a basis sequence index+ cover code index in any other desired way.

As one possible example mapping, the following formula may be used:

$$\text{Basis sequence index} = \text{mod}(f_k(k) - 1, K_B) + 1$$

$$\text{Cover code index} = \text{mod}\left(\frac{g_k(k)}{N} - 1, K_C\right) + 1$$

where k is link ID or UE ID, and $f_k$ and $g_k$ are MCF polynomials, such as:

$$f_k = a_k k + b_k (\text{frame \#} \times k)^2$$

$$g_k = c_k k + d_k (\text{frame \#} \times k)^2$$

Figure 26:
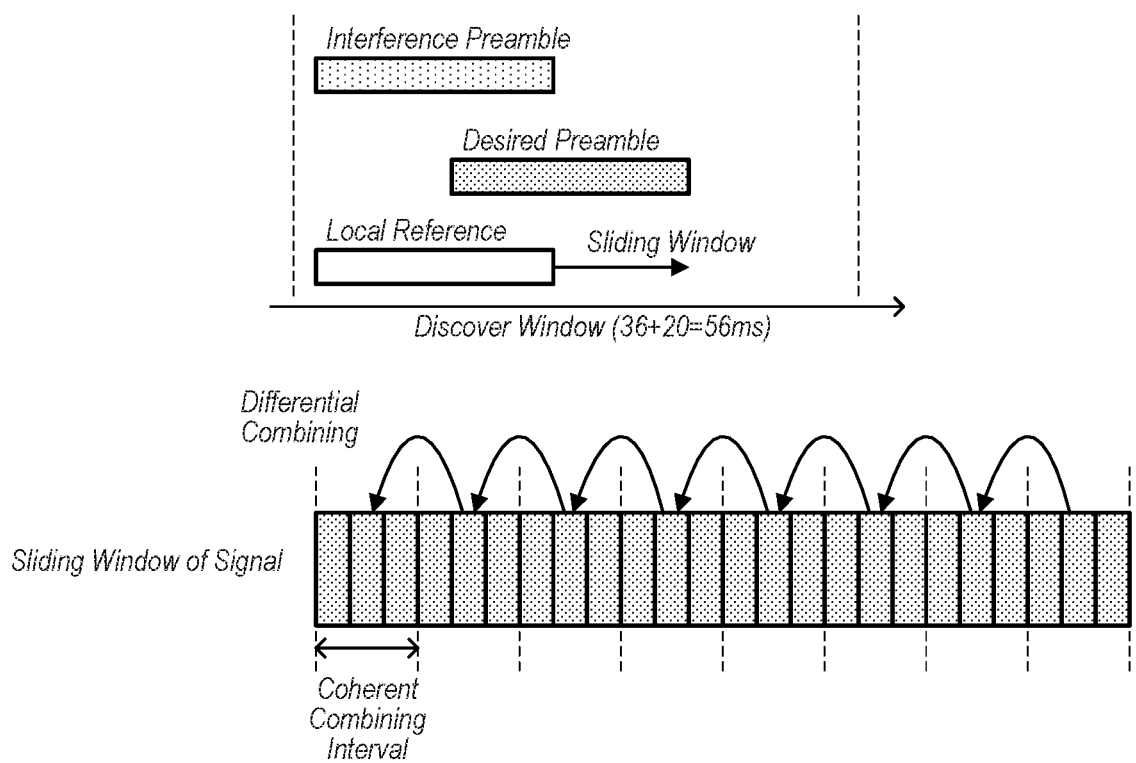
FIG. 26 illustrates example aspects of receiver preamble detection, according to some embodiments.

The basis sequence index and the cover code index may thus be associated with that ID, and a UE associated with that ID (e.g., as its UE ID or as a link ID for a link established by the UE) may perform preamble detection targeted to the synchronization sequence formed by combining the basis sequence associated with that basis sequence index and the cover code associated with that cover code index. For example, preamble detection may be performed in such a manner as illustrated in FIG. 26, e.g., where at each frame, a UE may monitor a few selected sequences during a discovery window. During the discovery window, the UE may use a sliding window to attempt to detect whether a desired preamble is being transmitted (with the possibility that one or more interference preambles may be transmitted in a temporally and frequency overlapping manner), e.g., by correlating a local reference of the desired preamble with received signals. As shown, coherent combining (e.g., over a coherent combining interval) and differential combining may both be used when attempting to detect a preamble.

Figure 27:
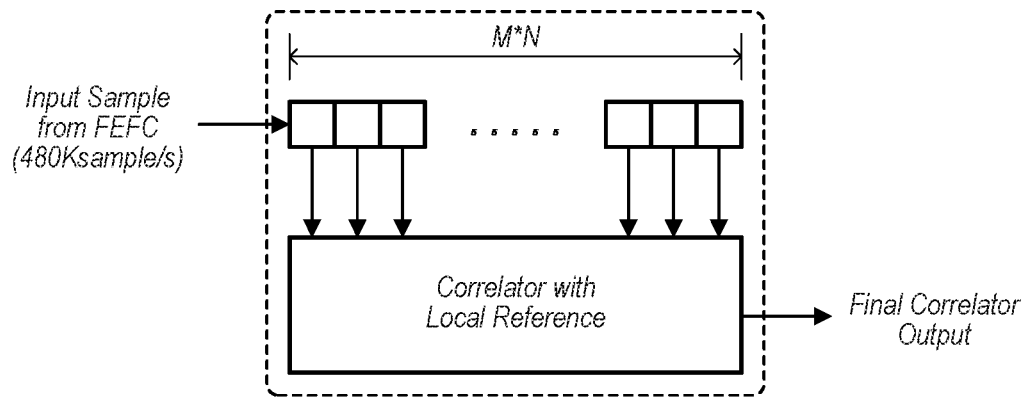
FIGS. 27-28 illustrate examples of possible receiver preamble detection architectures, according to some embodiments.
Figure 28:
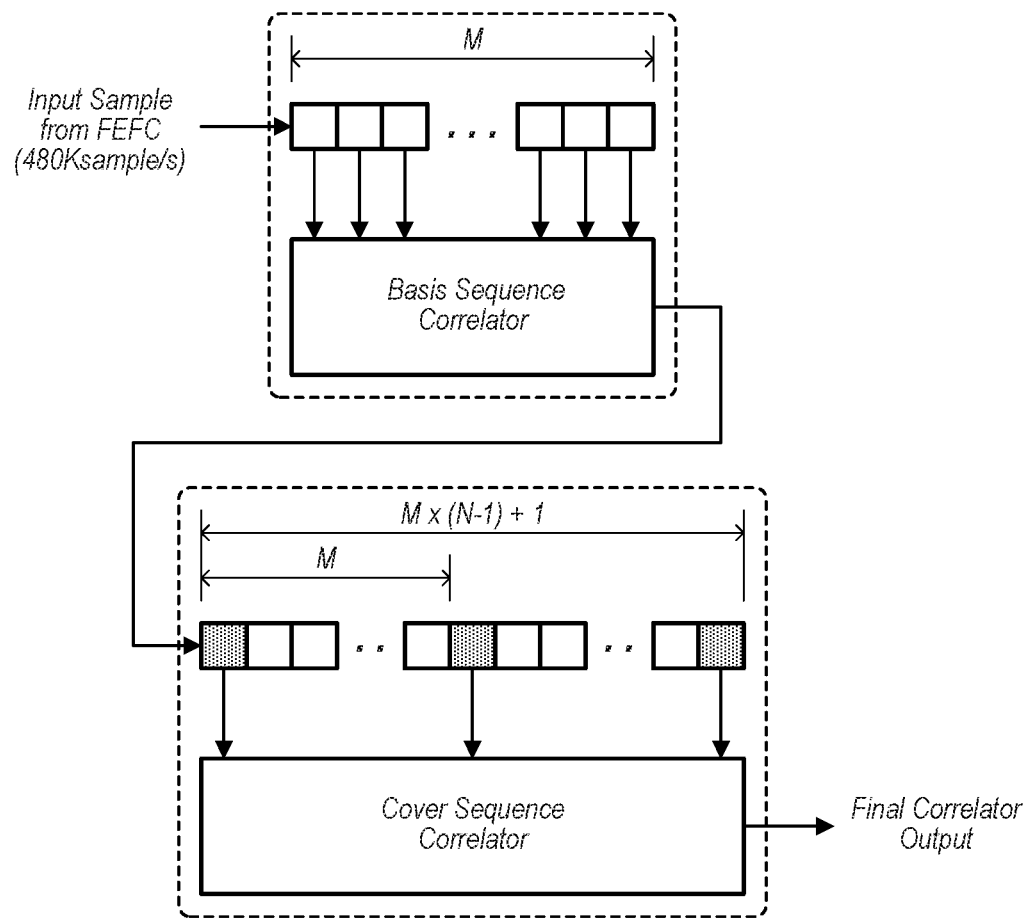

As previously noted, synchronization sequence detection complexity may also be an important consideration. FIGS. 27-28 illustrate exemplary possible correlator architectures that could be used for synchronization sequence detection by a receiver. FIG. 27 illustrates an architecture in which the correlation work for an entire synchronization sequence, having N repetitions of a M length basis sequence, is performed by a single correlator module. Using such an architecture, the amount of work needed to perform correlation may increase linearly with the length of the synchronization sequence (e.g., may be μM×N, where μ is a constant and much smaller than M, N).

FIG. 28 illustrates an alternative architecture that could be used in conjunction with a synchronization sequence design approach based at least in part on repetitions of a basis sequence multiplied by a cover code, such as described herein. The correlator architecture of FIG. 28 may be hierarchical, and may include a basis sequence correlator, as well as a cover sequence correlator. The basis sequence correlator may be responsible for correlating input samples with a local basis sequence reference (e.g., cross correlation, auto correlation, or a hybrid of auto and cross correlation could be used). The cover sequence correlator may be responsible for correlating the basis sequence output with the cover sequence. At least according to some embodiments, the cover sequence correlator may perform correlation using just a portion (e.g., one sample, as represented by the shading in FIG. 28) of each basis sequence repetition. Thus, it may effectively perform cover sequence removal, coherent combining over multiple symbols, and differential coherent combining steps. The complexity of such an approach may be drastically reduced, e.g., in comparison to the approach of FIG. 27, at least according to some embodiments. For example, the amount of work needed to perform correlation may be αM+βN, where α and β are constants and much smaller than M, N, e.g., since the cover sequence correlator may be able to perform the cover sequence correlation with a subset of the samples from the basis sequences.

In the following further exemplary embodiments are provided.

One set of embodiments may include a method, comprising: by a first wireless device: transmitting a preamble of a device-to-device wireless communication with a second wireless device, wherein the preamble comprises at least a first synchronization sequence, wherein the first synchronization sequence comprises a plurality of repetitions of a basis sequence multiplied by a cover code, wherein the basis sequence spans a plurality of orthogonal frequency division multiplexing (OFDM) symbols.

According to some embodiments, the method further comprises: selecting the first synchronization sequence from a plurality of possible synchronization sequences based at least in part on identification information for the first wireless device.

According to some embodiments, the method further comprises: selecting the first synchronization sequence from a plurality of possible synchronization sequences based at least in part on identification information for the second wireless device.

According to some embodiments, the method further comprises: selecting the first synchronization sequence from a plurality of possible synchronization sequences based at least in part on identification information for a wireless link between the first wireless device and the second wireless device. According to some embodiments, the method further comprises: selecting the basis sequence of the first synchronization sequence based on mapping a current frame number and at least a portion of the identification information to the basis sequence; and selecting the cover code of the first synchronization sequence based on mapping the current frame number and at least a portion of the identification information to the cover code.

Another set of embodiments may include a method, comprising: by a first wireless device: receiving a preamble of a device-to-device wireless communication with a second wireless device, wherein the preamble comprises at least a first synchronization sequence; wherein the first synchronization sequence comprises a plurality of repetitions of a basis sequence multiplied by a cover code, wherein the basis sequence spans a plurality of orthogonal frequency division multiplexing (OFDM) symbols.

According to some embodiments, the first synchronization sequence is selected from a plurality of possible synchronization sequences based at least in part on one or more of: identification information for the first wireless device; identification information for the second wireless device; or identification information for a wireless link between the first wireless device and the second wireless device.

According to some embodiments, the first synchronization sequence is selected from a plurality of possible synchronization sequences, wherein each of the plurality of possible synchronization sequences comprises a basis sequence selected from a plurality of possible basis sequences and a cover code selected from a plurality of possible cover codes.

According to some embodiments, the method further comprises: determining identification information associated with the preamble based at least in part on inclusion of the first synchronization sequence in the preamble.

According to some embodiments, the method further comprises: performing synchronization sequence detection using a hierarchical correlator, wherein the hierarchical correlator comprises a basis sequence correlator configured to correlate input samples with a local basis sequence reference, wherein the hierarchical correlator further comprises a cover sequence correlator configured to correlate output samples from the basis sequence correlator with a local cover sequence reference.

According to some embodiments, the preamble comprises a plurality of synchronization sequences, each respective synchronization sequence of the preamble comprising a plurality of repetitions of a respective basis sequence multiplied by a respective cover code.

According to some embodiments, the plurality of synchronization sequences of the preamble are transmitted with a temporal gap between each consecutive pair of synchronization sequences.

According to some embodiments, the preamble is comprised in a cascaded preamble transmission, wherein each respective preamble of the cascaded preamble transmission comprises a respective synchronization sequence, wherein each respective synchronization sequence comprises a plurality of repetitions of a respective basis sequence multiplied by a respective cover code.

According to some embodiments, at least two synchronization sequences of the cascaded preamble transmission comprise a same set of synchronization sequence parameters.

According to some embodiments, at least two synchronization sequences of the cascaded preamble transmission comprise a different set of synchronization sequence parameters.

According to some embodiments, the synchronization sequence is transmitted using a narrowband frequency channel.

According to some embodiments, each OFDM symbol of the first synchronization sequence is multiplied by a cover bit of the cover code.

According to some embodiments, each basis sequence of the first synchronization sequence is multiplied by a cover bit of the cover code.

According to some embodiments, the basis sequence comprises at least a portion of a Zadoff-Chu sequence.

According to some embodiments, the basis sequence comprises a sequence generated by multiplying at least a portion of a M-sequence with at least a portion of a Zadoff-Chu sequence.

According to some embodiments, the basis sequence comprises a sequence generated by multiplying at least a portion of a Gold code with at least a portion of a Zadoff-Chu sequence.

According to some embodiments, the preamble is transmitted using a frequency hopping pattern.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for operating a second wireless device, the apparatus comprising:
a processor configured to cause the second wireless device to:
perform synchronization sequence detection using a hierarchical correlator, wherein the hierarchical correlator comprises a basis sequence correlator configured to correlate input samples with a local basis sequence reference, wherein the hierarchical correlator further comprises a cover sequence correlator configured to correlate output samples from the basis sequence correlator with a local cover sequence reference;

receive a first preamble of device-to-device wireless communication from a first wireless device, wherein the first preamble comprises at least a first synchronization sequence, wherein the first synchronization sequence is received multiple times according to a time domain pattern comprising:
  a plurality of continuous symbols carrying the first synchronization sequence within a burst;
  a plurality of bursts per period; and
  a period duration; and
determine, based on the first synchronization sequence, identification information of the first wireless device.

2. The apparatus of claim 1,
wherein the processor is further configured to cause the second wireless device to transmit, to the first wireless device, a second preamble of device-to-device wireless communication, wherein the second preamble comprises at least a second synchronization sequence selected based on identification information of the second wireless device.

3. The apparatus of claim 2, wherein the second synchronization sequence is selected further based on a frame number.

4. The apparatus of claim 1, wherein the first preamble comprises a plurality of synchronization sequences, each respective synchronization sequence of the first preamble comprising a plurality of repetitions of a respective basis sequence multiplied by a respective cover code.

5. The apparatus of claim 4,
wherein the plurality of synchronization sequences is transmitted with a temporal gap between each consecutive pair of synchronization sequences.

6. The apparatus of claim 1, wherein the first preamble is received periodically.

7. The apparatus of claim 1, wherein respective bursts of the plurality of bursts comprise respective pluralities of continuous symbols carrying the first synchronization sequence.

8. A second wireless device, comprising:
a radio; and
a processor operably coupled to the radio and configured to cause the second wireless device to:
  perform synchronization sequence detection using a hierarchical correlator, wherein the hierarchical correlator comprises a basis sequence correlator configured to correlate input samples with a local basis sequence reference, wherein the hierarchical correlator further comprises a cover sequence correlator configured to correlate output samples from the basis sequence correlator with a local cover sequence reference;
  receive a first preamble of device-to-device wireless communication from a first wireless device, wherein the first preamble comprises at least a first synchronization sequence, wherein the first synchronization sequence is received multiple times according to a time domain pattern comprising:
    a plurality of continuous symbols carrying the first synchronization sequence within a burst;
    a plurality of bursts per period; and
    a period duration; and
  determine, based on the first synchronization sequence, identification information of the first wireless device.

9. The second wireless device of claim 8,
wherein the processor is further configured to cause the second wireless device to transmit, to the first wireless device, a second preamble of device-to-device wireless communication, wherein the second preamble comprises at least a second synchronization sequence selected based on identification information of the second wireless device.

10. The second wireless device of claim 9, wherein the second synchronization sequence is selected further based on a frame number.

11. The second wireless device of claim 8, wherein the first preamble comprises a plurality of synchronization sequences, each respective synchronization sequence of the first preamble comprising a plurality of repetitions of a respective basis sequence multiplied by a respective cover code.

12. The second wireless device of claim 11,
wherein the plurality of synchronization sequences is transmitted with a temporal gap between each consecutive pair of synchronization sequences.

13. The second wireless device of claim 8, wherein the first preamble is received periodically.

14. The second wireless device of claim 8, wherein respective bursts of the plurality of bursts comprise respective pluralities of continuous symbols carrying the first synchronization sequence.

15. A method, comprising:
performing synchronization sequence detection using a hierarchical correlator, wherein the hierarchical correlator comprises a basis sequence correlator configured to correlate input samples with a local basis sequence reference, wherein the hierarchical correlator further comprises a cover sequence correlator configured to correlate output samples from the basis sequence correlator with a local cover sequence reference;
receiving a first preamble of device-to-device wireless communication from a first wireless device, wherein the first preamble comprises at least a first synchronization sequence, wherein the first synchronization sequence is received multiple times according to a time domain pattern comprising:
  a plurality of continuous symbols carrying the first synchronization sequence within a burst;
  a plurality of bursts per period; and
  a period duration; and
determining, based on the first synchronization sequence, identification information of the first wireless device.

16. The method of claim 15,
further comprising, transmitting, to the first wireless device, a second preamble of device-to-device wireless communication, wherein the second preamble comprises at least a second synchronization sequence selected based on identification information.

17. The method of claim 16, wherein the second synchronization sequence is selected further based on a frame number.

18. The method of claim 15, wherein the first preamble comprises a plurality of synchronization sequences, each respective synchronization sequence of the first preamble comprising a plurality of repetitions of a respective basis sequence multiplied by a respective cover code.

19. The method of claim 18,
wherein the plurality of synchronization sequences is transmitted with a temporal gap between each consecutive pair of synchronization sequences.

20. The method of claim 15, wherein the first preamble is received periodically.

* * * * *